(12) United States Patent
Slaton et al.

(10) Patent No.: US 9,393,963 B2
(45) Date of Patent: Jul. 19, 2016

(54) PREDICTIVE CRUISE CONTROL SYSTEM WITH ADVANCED OPERATOR CONTROL AND FEEDBACK

(71) Applicants: Zachary Slaton, Seattle, WA (US); Floris van der Meijs, 's-Hertogenbosch (NL); Steven Karl Jahns, Bellingham, WA (US); John William Arthur Doll, Renton, WA (US); Josef Lotz, Monroe, WA (US); Andrew Paul Harbach, Argyle, TX (US); Wesley M. Mays, Coppell, TX (US); Cas Droogendijk, Eindhoven (NL)

(72) Inventors: Zachary Slaton, Seattle, WA (US); Floris van der Meijs, 's-Hertogenbosch (NL); Steven Karl Jahns, Bellingham, WA (US); John William Arthur Doll, Renton, WA (US); Josef Lotz, Monroe, WA (US); Andrew Paul Harbach, Argyle, TX (US); Wesley M. Mays, Coppell, TX (US); Cas Droogendijk, Eindhoven (NL)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 14/491,968

(22) Filed: Sep. 19, 2014

(65) Prior Publication Data

US 2016/0082960 A1     Mar. 24, 2016

(51) Int. Cl.
   *B60T 8/32* (2006.01)
   *B60W 30/14* (2006.01)
(52) U.S. Cl.
   CPC .................... *B60W 30/143* (2013.01)
(58) Field of Classification Search
   CPC .................................................. G01C 21/3697
   See application file for complete search history.

(56) References Cited

U.S. PATENT DOCUMENTS

| 5,663,880 | A | 9/1997 | Saur |
|---|---|---|---|
| 5,713,428 | A | 2/1998 | Linden |
| 5,839,534 | A | 11/1998 | Chakraborty |
| 6,076,036 | A | 6/2000 | Price |
| 6,076,622 | A | 6/2000 | Chakraborty |
| 6,081,762 | A | 6/2000 | Richardson |

(Continued)

FOREIGN PATENT DOCUMENTS

| WO | 2013/095237 A1 | 6/2013 |
|---|---|---|
| WO | 2013/095238 A1 | 6/2013 |

OTHER PUBLICATIONS

Ramsey, J., "Freightliner Debuts RunSmart Predictive Cruise Control," Autoblog, Mar. 22, 2009, <http://www.autoblog.com/2009/03/22/freightliner-debuts-runsmart-predictive-cruise-control/> [retrieved Aug. 7, 2014], 5 pages.

(Continued)

*Primary Examiner* — Michael D Lang
(74) *Attorney, Agent, or Firm* — Christensen O'Connor Johnson Kindness PLLC

(57) ABSTRACT

An on-board vehicle computer system for a vehicle includes at least one processing unit and a memory having stored therein computer-executable instructions configured to cause the on-board vehicle computer system to implement various aspects of a predictive cruise control (PCC) system. In one aspect, the computer system provides a plurality of available speed control bands in a PCC system, and the available speed control bands are selectable by an operator of the vehicle. In another aspect, the computer system provides an upper speed margin and a lower speed margin for a PCC system, and the upper and lower speed margins are adjustable by an operator of the vehicle. Related notifications may be presented via an operator interface (e.g., a touchscreen display provided in a vehicle dashboard or other easily accessible area).

15 Claims, 25 Drawing Sheets

(56) References Cited

U.S. PATENT DOCUMENTS

| | | | |
|---|---|---|---|
| 6,233,515 B1 | 5/2001 | Engelman | |
| 6,360,158 B1 | 3/2002 | Hanawa | |
| 6,374,173 B1 | 4/2002 | Ehlbeck | |
| 6,470,256 B1 | 10/2002 | Cikalo | |
| 6,485,341 B1 | 11/2002 | Lanyi | |
| 6,658,344 B2 | 12/2003 | Hirasago | |
| 6,748,312 B2 | 6/2004 | Russell | |
| 6,820,709 B1 | 11/2004 | Zimmermann | |
| 6,990,401 B2 | 1/2006 | Neiss | |
| 7,225,073 B2 | 5/2007 | Hedman | |
| 7,233,854 B2 | 6/2007 | Rayl | |
| 7,317,973 B2 | 1/2008 | Dieterle | |
| 7,437,232 B2 | 10/2008 | Tengler | |
| 7,490,000 B2 | 2/2009 | Siddiqui | |
| 7,765,058 B2 | 7/2010 | Doering | |
| 7,925,416 B2 | 4/2011 | Perisho, Jr. | |
| 8,055,427 B2 | 11/2011 | Shin | |
| 8,103,423 B2 | 1/2012 | Inoue | |
| 8,131,442 B2 | 3/2012 | Labuhn | |
| 8,214,122 B2 | 7/2012 | Krupadanam | |
| 8,229,644 B2 | 7/2012 | Boecker | |
| 8,265,850 B2 | 9/2012 | Shin | |
| 8,311,720 B2 | 11/2012 | Pelosse | |
| 8,315,775 B2 | 11/2012 | Biondo | |
| 8,340,884 B1 | 12/2012 | He et al. | |
| 8,346,456 B2 | 1/2013 | Aleksic | |
| 8,386,091 B2 | 2/2013 | Kristinsson | |
| 8,423,259 B2 | 4/2013 | Labuhn | |
| 8,428,843 B2 | 4/2013 | Lee | |
| 8,498,795 B2 | 7/2013 | Eriksson | |
| 8,606,459 B2 | 12/2013 | Sekiyama | |
| 8,700,256 B2 | 4/2014 | Duraiswamy | |
| 8,712,664 B2 | 4/2014 | Oosawa | |
| 9,020,726 B2 | 4/2015 | Boeckenhoff | |
| 2003/0221886 A1 | 12/2003 | Petrie | |
| 2004/0193353 A1 | 9/2004 | Dunoyer | |
| 2006/0271275 A1* | 11/2006 | Verma | 701/200 |
| 2006/0293822 A1 | 12/2006 | Lattemann | |
| 2007/0265759 A1 | 11/2007 | Salinas | |
| 2008/0033624 A1 | 2/2008 | Gronau | |
| 2010/0049400 A1 | 2/2010 | Duraiswamy et al. | |
| 2010/0217494 A1* | 8/2010 | Heft et al. | 701/70 |
| 2011/0054768 A1 | 3/2011 | Sullivan | |
| 2011/0130939 A1 | 6/2011 | Hartmann | |
| 2011/0172871 A1 | 7/2011 | Hall | |
| 2012/0283928 A1 | 11/2012 | Bjernetun | |
| 2013/0030668 A1 | 1/2013 | Eriksson | |
| 2013/0035837 A1 | 2/2013 | Johansson | |
| 2013/0066493 A1 | 3/2013 | Martin et al. | |
| 2013/0085651 A1 | 4/2013 | Johannsson | |
| 2013/0151106 A1 | 6/2013 | Johansson | |
| 2013/0158829 A1 | 6/2013 | Schumann | |
| 2014/0074370 A1 | 3/2014 | Johansson | |
| 2014/0074371 A1 | 3/2014 | Johansson | |
| 2014/0236448 A1 | 8/2014 | Eriksson et al. | |
| 2014/0266660 A1 | 9/2014 | Slaton | |

OTHER PUBLICATIONS

Office Action mailed Nov. 25, 2015, from U.S. Appl. No. 14/555,454, filed Nov. 26, 2014, 8 pages.

Extended European Search Report mailed Mar. 2, 2016, issued in corresponding Application No. EP 15185516.0, filed Sep. 16, 2015, 5 pages.

* cited by examiner

| SIGNAL | TYPE | RANGE |
|---|---|---|
| PCC STATE | STATE | FULLY_ACTIVE<br>ERR_VEHICLE_POSITION_UNVAILABLE<br>ERR_MAP_LOCATION_UNAVAILABLE<br>ERR_SLOPE_INFO_UNAVAILABLE<br>ERR_PREDICTED_PATH_UNAVAILABLE<br>VEHICLE_SPEED_TOO_LOW |
| PCC SET SPEED | CONTINUOUSLY VARIABLE | 0 TO 128 MPH |
| CURRENT SLOPE | STATE | DOWN<br>FLAT<br>UP |
| FUTURE SLOPE | STATE | DOWN<br>FLAT<br>UP |
| VEHICLE SPEED | CONTINUOUSLY VARIABLE | 0 TO 128 MPH |
| CC SET SPEED | CONTINUOUSLY VARIABLE | 0 TO 128 MPH |
| ENHANCED DRIVER FEEDBACK | BOOLEAN | FALSE<br>TRUE |
| INITIATE SELF TEST | BOOLEAN | FALSE<br>TRUE |
| LOWER LIMIT | CONTINUOUSLY VARIABLE | -10 TO 0 MPH |
| UPPER LIMIT | CONTINUOUSLY VARIABLE | 0 TO 10 MPH |
| VEHICLE MODE | STATE | PARKED<br>DRIVING |

FIG. 3

PREDICTIVE CRUISE CONTROL SYSTEM WITH ADVANCED OPERATOR CONTROL AND FEEDBACK

BACKGROUND

Predictive cruise control (PCC) systems are enhancements to traditional cruise control systems that set a target speed to be maintained by a vehicle in motion while the cruise control functionality is active. PCC systems automatically adjust cruise control target speeds based on a variety of inputs, such as a vehicle's position relative to a location on a route map, terrain or slope information, and predicted or predetermined paths to a destination. PCC systems, when properly used, can improve the fuel efficiency of a vehicle compared with traditional cruise control systems. Prior PCC systems have typically provided very little information to the operator of the vehicle, even to the extent of providing no signal to the operator that a PCC system is even active. Therefore, prior PCC systems may be undesirable for some operators, especially those having less experience with PCC systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some aspects, an on-board vehicle computer system for a vehicle includes at least one processing unit and a memory having stored therein computer-executable instructions configured to cause the on-board vehicle computer system to implement various aspects of a predictive cruise control (PCC) system. In one aspect, the computer system provides a plurality of available speed control bands in a PCC system, and the available speed control bands are selectable by an operator of the vehicle. Operator notifications associated with the PCC system may be presented via an operator interface (e.g., a touchscreen display provided in a vehicle dashboard or other easily accessible area). Presentation of the operator notifications may be based at least in part on a count of PCC speed change events, such as a count of events missed due to deactivation of the PCC system. Presentation of the operator notifications also may be based at least in part on a reminder setting, which may be adjustable by the operator of the vehicle. The operator notifications may include a speed control band adjustment notification that indicates a proposed change from a currently active speed control band to another of the available speed control bands. Presentation of the speed control band adjustment notification may be based on, for example, a speed change event in which a new PCC set speed is outside the currently active speed control band, or a count of speed change events in which PCC set speeds are outside the currently active speed control band.

In another aspect, the computer system provides an upper speed margin and a lower speed margin for a PCC system, and the upper and lower speed margins are adjustable by an operator of the vehicle. The upper and lower speed margins may be associated with a speed control band. The computer system may present an operator interface configured to allow adjustments of the upper and lower speed margins by the operator of the vehicle.

In another aspect, the computer system determines a speed control band for the vehicle in a PCC system, wherein the speed control band comprises an upper speed margin and a lower speed margin. The computer system compares the upper speed margin with a driver rewards offset value and, based on the comparison, updates the upper speed margin for the speed control band. For example, if the driver rewards offset value is less than the upper speed margin, the updated upper speed margin is equal to the driver rewards offset value. The driver rewards offset value may be based at least in part on a current driver reward speed offset, a maximum vehicle speed bonus, or a fuel economy setting.

In another aspect, the PCC system analyzes roadway slope information calculates a PCC set speed based at least in part on the roadway slope information and a currently active speed control band. The currently active speed control band is selected (e.g., by an operator of the vehicle) from a plurality of available speed control bands. The computer system may present an operator notification indicating an upcoming change in roadway slope based on the roadway slope information or an operator notification indicating an upcoming change in vehicle speed based on the calculated PCC set speed.

In some aspects, reminder notifications are presented via an operator interface (e.g., a touchscreen display provided in a vehicle dashboard or other easily accessible area). In one aspect, an on-board vehicle computing system determines a new PCC set speed for the vehicle, detects that the PCC system is disabled (e.g., by the operator of the vehicle), and presents a PCC activation reminder notification via the operator interface. Presentation of the PCC activation reminder notification may be based at least in part on a reminder setting, which may be adjustable by the operator of the vehicle and/or a count of speed change events.

In another aspect, the computing system determines a new PCC set speed for the vehicle, compares the new PCC set speed with a current speed control band, and, based on the comparison, presents a speed control band adjustment notification via the operator interface. Presentation of the speed control band adjustment notification may be based at least in part on a feedback setting, which may be adjustable by the operator of the vehicle. Presentation of the speed control band adjustment notification may also be based on a count of speed change events in which PCC set speeds are outside a currently active speed control band.

DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 3 is a table of illustrative signals depicted in FIG. 1;

DETAILED DESCRIPTION

Figure 1:
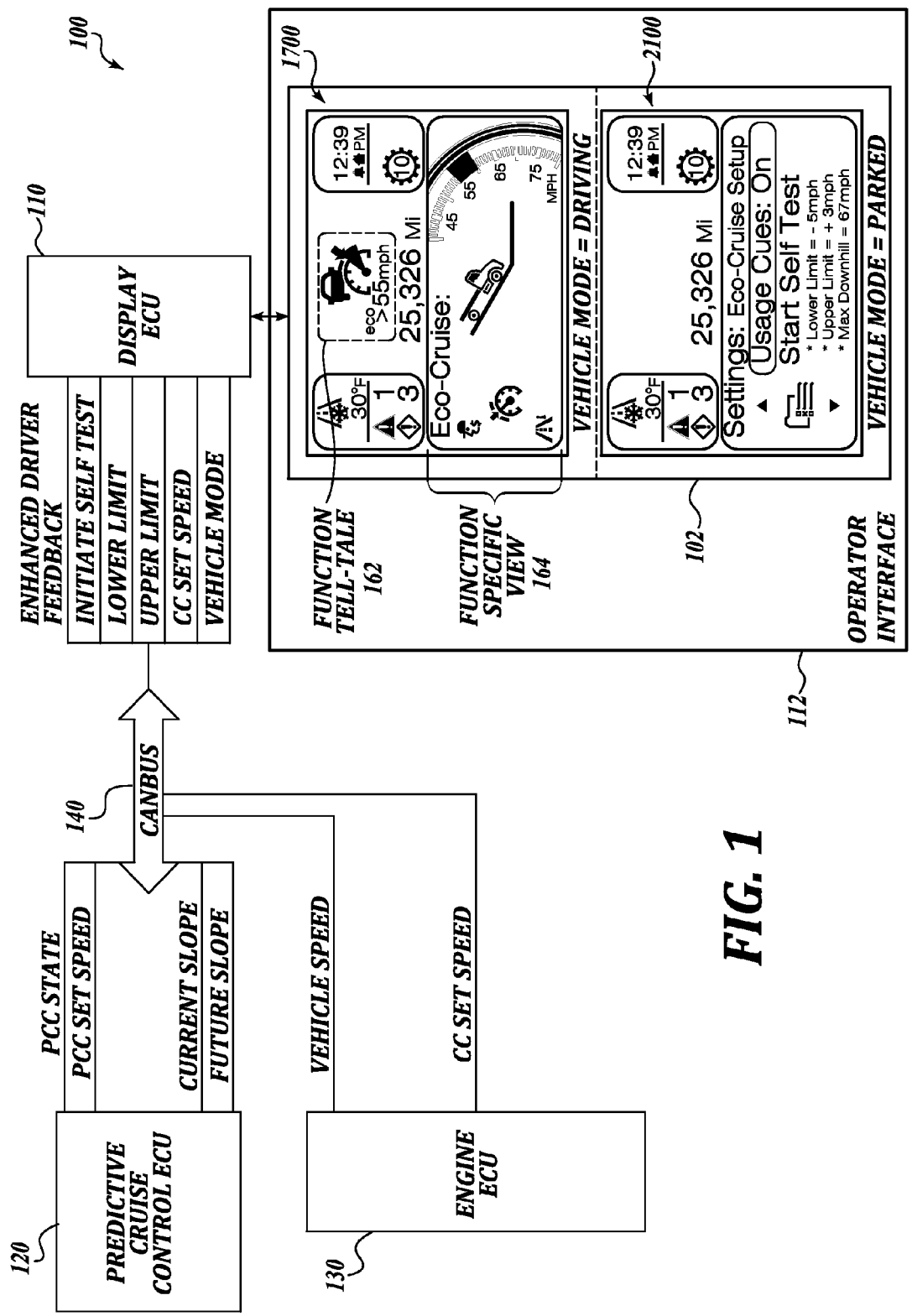
FIGS. 1 and 2 are schematic diagrams of an illustrative on-board vehicle computer system having a PCC system with advanced operator control and feedback functionality.

The detailed description set forth below in connection with the appended drawings is an illustrative and non-limiting description of various embodiments of the disclosed subject matter. The following description proceeds with reference to examples of systems and methods suitable for use in vehicles, such as Class 8 trucks. Although illustrative embodiments of the present disclosure will be described hereinafter with reference to trucks, it will be appreciated that aspects of the present disclosure have wide application, and therefore, may be suitable for use with many types of vehicles, such as passenger vehicles, buses, commercial vehicles, light and medium duty vehicles, etc.

It should be understood that various embodiments of the present disclosure include logic and operations performed by electronic components. These electronic components, which may be grouped in a single location or distributed over a wide area, generally include processors, memory, storage devices, display devices, input devices, etc. It will be appreciated by one skilled in the art that the logic described herein may be implemented in a variety of hardware, software, and combined hardware/software configurations, including but not limited to, analog circuitry, digital circuitry, processing units, and the like. In circumstances where the components are distributed, the components are accessible to each other via communication links. A controller area network bus (or CAN bus) can be used to communicate vehicle operating conditions, e.g., as specified by the Society of Automotive Engineers (SAE) J1939 standard.

Components and modules described herein may be communicatively coupled by any suitable means, e.g., an internal communications network such as a vehicle bus that uses a controller area network (CAN) protocol, a local interconnect network (LIN) protocol, and/or the like. Those of ordinary skill in the art will recognize that the vehicle bus may be implemented using any number of different communication protocols such as, but not limited to, Society of Automotive Engineers ("SAE") J1587, SAE J1922, SAE J1939, SAE J1708, and combinations thereof. In other embodiments, components may be connected by other networking protocols, such as Ethernet, Bluetooth, TCP/IP, and/or the like. In still other embodiments, components may be directly connected to each other without the use of a vehicle bus, such as by direct wired connections between the components. Embodiments of the present disclosure may be implemented using other types of currently existing or yet-to-be-developed in-vehicle computer systems without departing from the scope of the claimed subject matter.

Predictive Cruise Control System with Advanced Operator Control and Feedback

In general, predictive cruise control (PCC) systems can automatically adjust a cruise control target speed based on a variety of inputs, such as a truck's position relative to a location on a route map, terrain or slope information, and predicted or predetermined paths to a destination. PCC systems, when properly used, can improve the fuel efficiency of a truck compared with traditional cruise control systems.

In described embodiments, the operator of a vehicle (e.g., a heavy duty truck) is provided with the ability to control and receive information relevant to the behavior of a PCC system. The level of human-machine interaction (HMI) and information supplied to the operator is scalable based on factors such as an operator's selected preferences, and is provided in an intuitive manner so as to minimize operator distractions.

Described embodiments allow customized experiences for operators with different preferences and levels of experience. For example, more experienced operators can reduce the amount of information presented to minimize distractions, and less experienced operators or experienced operators that prefer higher levels of feedback can increase the amount of information presented to enable operators to reap greater benefits from the PCC system.

Described embodiments also provide operators with control features such as the ability to select from among several speed control bands with different positive and negative offsets. (For brevity, speed control bands are referred to herein simply as "control bands.") Although such offsets are referred to herein as "positive" or "negative" to reflect common scenarios in which such offsets are used to increase or decrease vehicle speed, positive and negative offsets may also be zero in some situations, and thus need not be strictly positive or negative values. For example, a control band with zero positive offset can be used as an initial control band when the PCC system is initiated, which can provide safety and compliance-related benefits while encouraging the operator to allow the PCC system to remain active whenever cruise control is active, and thus achieve the expected fuel economy improvement.

Described embodiments also provide the ability to deactivate the PCC system temporarily. Operators can be notified when the PCC system is active and when it is not. If the PCC system is not active, the PCC system can provide feedback as to why it is not active. Described embodiments also provide the ability to receive reminders and coaching messages designed to encourage the operator to activate (or reactivate) the PCC system, select a wider control band, and the like, in order to improve fuel efficiency and the operator's driving experience.

Described embodiments also provide a method for detecting events in which the PCC system will set a target vehicle speed outside of the current control band but within a wider control band, as well as the ability to provide a notice to the operator to choose a wider control band ahead of such events and thereby take advantage of fuel economy or drivability gains that may be provided by the PCC system.

The frequency of operator notifications can be calibrated to avoid unnecessarily distracting or annoying the operator. Notifications also can be turned off, if needed (e.g., for the duration of a single key cycle). Notifications that may be missed (e.g., due to deactivation of the PCC system) can be tracked. For example, a count of missed speed change events can be used to determine whether to remind an operator to activate the PCC system.

In described embodiments, the PCC system also can provide different types and amounts of information based on truck status. For example, the PCC system can provide more information or more interactive features (e.g., setup utilities, diagnostic utilities, etc.) when the truck is parked in order to take advantage of the operator's ability to pay more attention to the PCC system when the truck is not in motion. As another example, the PCC system can provide less information or less interactive features when the truck is in motion in order to reduce the risk of distracting the operator.

Visual cues such as graphical speedometer indicators, diagrams, text, icons, and the like can be used to communicate truck status, PCC system status, suggested actions, and other information that can be used to encourage particular operator behavior, which may increase PCC system usage or enhance the benefits of the PCC system when it is in use. The PCC system can allow operator control of some features and settings (e.g., to reduce or increase PCC system feedback, to avoid exceeding posted speed limits, etc.) while also biasing the system towards more desirable outcomes such as better fuel economy (which can benefit an entire fleet) and away from outcomes such as faster drive times (which may only benefit an individual operator).

Prior PCC systems have typically provided very little information to the operator, even to the extent of providing no signal to the operator that a PCC system is active. Such systems can be undesirable for operators, especially those having less experience with PCC systems. Such systems can be confusing for an operator that may notice changes in truck behavior without being notified that a PCC system is active. Prior systems can interfere with the operator's ability to understand whether or not the truck is providing the intended functionality and resultant savings that PCC systems can provide. Prior systems that provide no opportunity for the operator to control the maximum and minimum offsets from the cruise control set speed may require minimal interaction from the operator, but lack of feedback and operator control can lead the operator to deactivate predictive cruise control completely if the vehicle's speed deviates too much, or without warning, from the cruise control set point.

Embodiments described herein provide advantages over prior systems. For example, if the operator is traveling at the speed limit to maintain traffic flow and drive cycle time, the operator may not want to exceed the speed limit for safety or legal reasons, but the operator may be willing to reduce speed on hills to save fuel. In described embodiments, the operator's ability to choose a control band with zero positive offset can encourage use of the PCC system while respecting the operator's desire to avoid an increase in speed and thus reducing the chance that the operator will decide to deactivate the PCC system. As another example, if the operator is traveling down a hill where the heavier weight of the truck tends to make downhill velocities faster, the operator may choose to reduce the cruise control's positive offset to maintain a safe distance from lower-weight traffic ahead that tends to travel at slower speeds.

Illustrative Predictive Cruise Control System

This section describes features of an illustrative PCC system within an on-board vehicle computer system. In the illustrative PCC system, information can be provided to a truck operator to provide feedback and guide operator behavior. Although illustrative details are provided in this section, it should be understood that alternative systems and methods can be implemented and used in accordance with the present disclosure.

FIG. 1 illustrates one embodiment of a vehicle computer system 100 with PCC functionality, according to various aspects of the present disclosure. The system 100 includes electronic control units (ECUs) 110, 120, and 130 that monitor truck status, control PCC functionality, generate operator notifications, and the like.

The ECUs 110, 120, and 130 can be implemented in a variety of hardware, software, and combined hardware/software configurations, for carrying out aspects of the present disclosure. For example, the ECUs 110, 120, and 130 may include memory and a processor. In one embodiment, the memory comprises a random access memory ("RAM") and an electronically erasable, programmable, read-only memory ("EEPROM") or other non-volatile memory (e.g., flash memory) or persistent storage. The RAM may be a volatile form of memory for storing program instructions that are accessible by the processor. The processor is configured to operate in accordance with program instructions. The memory may include program modules, applications, instructions, and/or the like that are executable by the processor and implement functionality described herein.

The ECUs 110, 120, and 130 may be communicatively coupled to sensors that provide information concerning the status of the truck. For example, the engine ECU 130 may be communicatively coupled to one or more sensors that measure vehicle speed, and this information can be used to set a value for the Vehicle Speed signal depicted in FIG. 1. As another example, the PCC ECU 120 may be communicatively coupled to one or more sensors that measure a current slope of the roadway on which the truck is traveling, and this information can be used to set a value for the Current Slope signal depicted in FIG. 1.

In the example shown in FIG. 1, the ECUs 110, 120, and 130 communicate via a CAN bus 140. Illustrative signals are shown that can be transmitted and/or received by the ECUs 110, 120, and 130. Such signals make efficient use of space on the CAN bus 140 and can be used to implement PCC functionality within the system 100. For example, the display ECU 110 can generate and/or process signals such as Enhanced Driver Feedback, Initiate Self Test, Lower Limit, Upper Limit, CC (Cruise Control) Set Speed, and Vehicle Mode; the predictive cruise control ECU 120 can generate and/or process signals such as PCC State, PCC Set Speed, Current Slope, and Future Slope; and the engine ECU 130 can generate and/or process signals such as Vehicle Speed and CC Set Speed.

The type and value range of the illustrative signals depicted in FIG. 1 are shown in table 200 in FIG. 3 and described in further detail below. Illustrative uses of these signals and other signals are described in detail below.

In this example, PCC State describes whether the PCC system is active. If the PCC system is not active, PCC State also may include an indication of why the PCC system is not active. As shown in table 200, PCC State can be, for example, in a "Fully Active" state or in an inactive state that may be caused by any of several possible error conditions (e.g., truck position is unavailable, map location is unavailable, slope information is unavailable, predicted path is unavailable, or vehicle speed is too slow). CC Set Speed describes an operator-specified vehicle set speed for cruise control functionality, whereas PCC Set Speed describes a target vehicle speed set by the PCC system. In the example shown in FIG. 3, these parameters are described, along with Vehicle Speed, as being continuously variable in a range of 0 to 128 mph, although in operation these parameters typically will be restricted to a smaller range (e.g., by a maximum pedal speed, a maximum or minimum cruise control set speed, etc.).

Current Slope and Future Slope can be used to describe current terrain and future terrain as being an upslope, a downslope, or flat. This information can be used to make adjustments to vehicle speed in the PCC system, as discussed in further detail below. Lower Limit and Upper Limit can be used to describe lower and upper speed margins in terms of negative offsets and positive offsets, respectively, for vehicle speed adjustments within the PCC system. In the example shown in FIG. 3, Lower Limit and Upper Limit are described as being continuously variable in a range of −10 to 0 mph and 0 to 10 mph, respectively, although in practice these parameters may be restricted to a smaller range (e.g., based on user preferences or system settings), as described in detail below.

In the example shown in FIG. 3, Enhanced Driver Feedback is defined as a Boolean value that is used to indicate whether additional driver feedback (e.g., in the form of operator notifications on a display) is desired, and Initiate Self Test is defined as a Boolean value that is used to indicate whether a PCC system self-test is to be initiated. Illustrative operator notifications and self-test utilities are described in detail below.

In the example shown in FIG. 1, the display ECU 110 communicates with an operator interface 112 that includes an operator display 102. The operator display 102 may be any type of display used in a truck to convey information to the operator. For example, the operator display 102 may include an LCD display configured to display information to the operator much like any other computing display. In a touch-screen configuration, the operator display 102 also has input capabilities. In addition to the operator display 102, the operator interface 112 also may include other output devices for visual output or other output, such as lamps, needle gauges, speakers, or haptic feedback devices, to provide information to the operator. The operator interface 112 also may include other input devices including buttons, toggles, keyboards, mechanical levers, and any other devices that allow an operator to provide input to the system 100.

In the example shown in FIG. 1, two illustrative display states 1700 and 2100 are shown that can be presented on the display 102. The display state 1700 is an example of a display state that may be in effect when the Vehicle Mode is "Driving." The display state 1700 includes a function tell-tale 162 with an icon to indicate that the truck is in an "Eco-Cruise" mode in which the PCC system is active. The display state 1700 also includes a function-specific view 164 that provides additional information related to the PCC system. The display state 2100 is an example of a display state that may be in effect when the Vehicle Mode is "Parked." The display state 2100 includes features of a PCC system setup utility. The features of the display states 1700 and 2100 and other illustrative display states are described in further detail below.

The ECUs 110, 120, and 130 may be communicatively coupled to other control modules that may affect or be affected by the ECUs. For example, referring to FIG. 2, the predictive cruise control ECU 120 is depicted as receiving signals from an advanced stability control module 170, an adaptive cruise control module 172, a driver reward module 174, a general cruise control module 176, and an engine retarder module 178.

The adaptive cruise control module 172 can provide a truck with the ability to detect objects in front of it and adjust vehicle speed to ensure proper spacing and reduce the possibility of collisions or the need for sudden braking. In at least one embodiment, if both ACC and PCC functionality are present, PCC functionality is not active unless ACC functionality is not in an error state. PCC also may be deactivated in response to other events related to vehicle status or operating conditions, such as a stability control event generated by the advanced stability control module 170.

Figure 2:
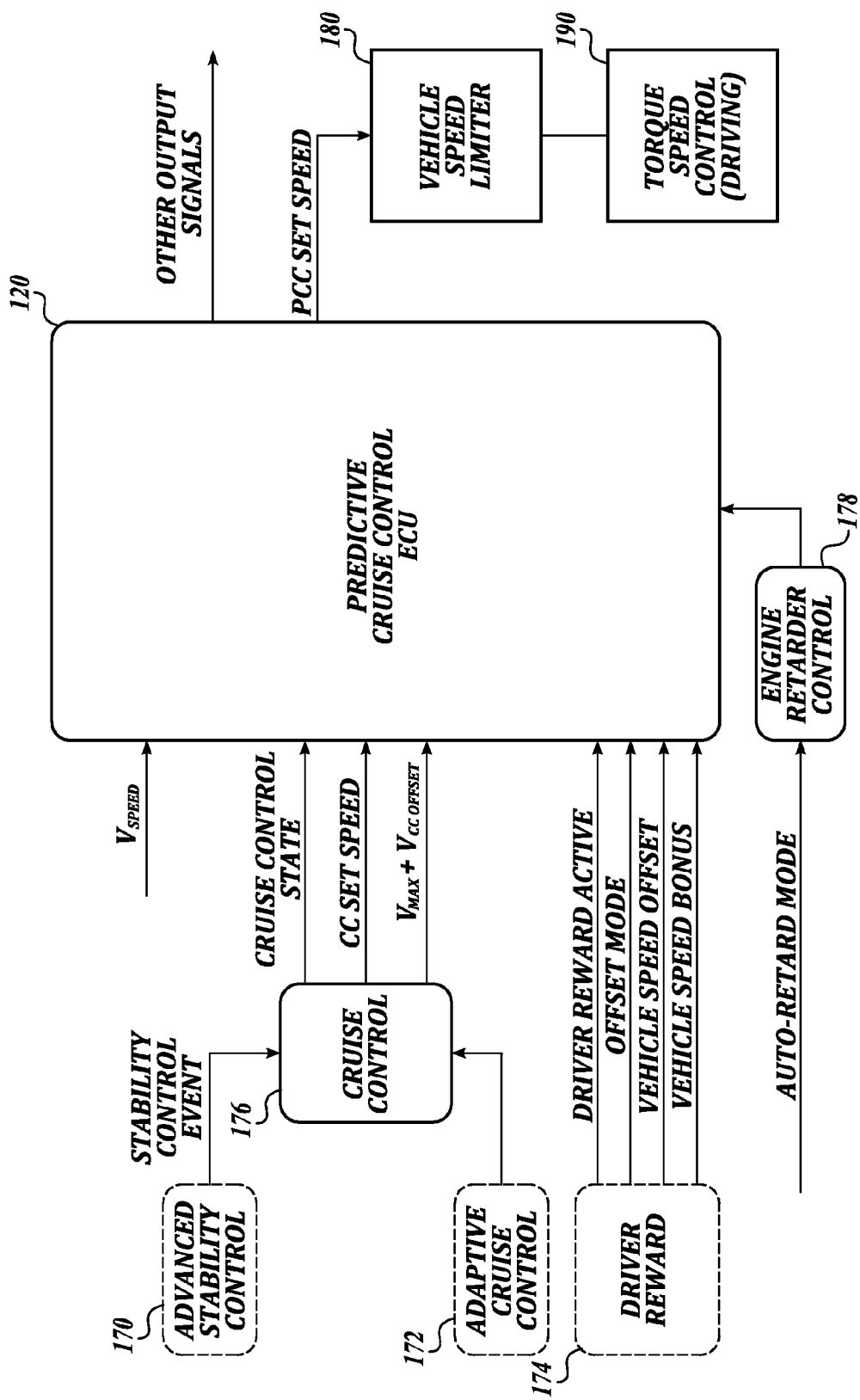

In the example shown in FIG. 2, illustrative input signals provided to the PCC ECU 120 include Cruise Control State, CC Set Speed, $V_{MAX}$, and $V_{CC\ OFFSET}$ from the cruise control module 176; Driver Reward Active, Offset Mode, Vehicle Speed Offset, and Vehicle Speed Bonus from the driver reward module 174, and $V_{OFFSET,\ DSC}$ from the engine retarder control module 178, and $V_{SPEED}$. In the example shown in FIG. 2, the predictive cruise control ECU 120 takes these inputs (and potentially other inputs, as may be provided by an operator or from other input sources) to generate output signals, including PCC Set Speed. PCC Set Speed may be provided to other modules, such as a vehicle speed limiter module 180 that may be communicatively coupled to a torque speed control module 190.

In this example, Cruise Control State indicates the state of the base cruise control functionality. Possible values of this state variable include Off, On, Active/Resume, Cancel, and Overrule. $V_{MAX}$ describes the maximum vehicle speed that is available via the accelerator pedal, with no active offsets. $V_{CC\ OFFSET}$ describes the offset speed from $V_{MAX}$ that is applied when cruise control is active. $V_{SPEED}$ describes the current vehicle speed. Driver Reward Active indicates whether the driver reward system is active, which can be used to provide performance bonuses, such as added speed, to reward operators for desirable behaviors or results (e.g., achieving a target fuel economy value). Offset Mode indicates whether any driver reward offsets are applied to the pedal speed limit, the cruise control speed limit, or both. Vehicle Speed Bonus describes the maximum vehicle speed offset within the driver reward functionality, and Vehicle Speed Offset describes the offset that is actually applied within the driver reward functionality.

$V_{OFFSET,\ DSC}$ describes an offset speed that defines a target speed for downhill speed control (DSC) module or other automatic engine retarding functionality. In at least one embodiment, DSC is enabled whenever the PCC system is enabled.

In at least one embodiment, although parameters such as $V_{MAX}$ and Vehicle Speed Offset may vary (e.g., based on driver rewards functionality), the PCC Set Speed need not automatically change in response to such changes. For example, PCC Set Speed may remain the same if changes in parameters such as $V_{MAX}$ or Vehicle Speed Offset still result in a calculated PCC Set Speed that remains within the currently active control band.

The ECUs 110, 120, and 130 also may be communicatively coupled to one or more vehicle data stores (not shown). Vehicle data stores may include suitable nonvolatile computer-readable storage media, such as an EEPROM, flash memory, hard disk, or the like. Vehicle data may be used by the system 100, as described herein, to perform one or more of the functions described herein. Vehicle data may include data that is sensed and stored during vehicle operation, as well as programmable settings that can be programmed by the vehicle manufacturer, the owner, the operator, or any other suitable entity.

Illustrative Operator Notifications

A variety of graphics, messages, and other output can be used to provide feedback to operators. Such feedback can be referred to as operator notifications. In a truck with a PCC system, operator notifications can be used to provide detailed information to operators that describe, for example, the status of the PCC system and suggestions for increasing the benefits of the PCC system. In any of the examples described herein, the content, appearance, or presence of operator notifications may depend on operator preferences, system settings, or other factors. It at least one embodiment, the appearance or presence of some operator notifications depends on the value of the Enhanced Driver Feedback variable described above. Example operator notifications are described in detail below.

In examples described herein, operator notifications comprising visual elements are described. Depending on implementation, the visual elements can include graphics, text, icons, and the like. Depending on implementation, one or more visual elements may be activated (e.g., by touch in a touch-enabled interface) to access additional information or functionality. Operator notifications may be displayed for a defined period of time or until a particular event occurs. Notifications may be non-suppressible or suppressible. Non-suppressible notifications may not be dismissed until an underlying condition is satisfied, while suppressible notifications may be dismissed at an operator's discretion.

The visual and functional elements described in the following examples can be replaced with any other elements that are suitable for communicating the information described in these examples. Further, the elements described in the following examples can be presented in different ways (e.g., in different colors, sizes, or display locations; animated or static; flashing or not flashing; flashing at different rates; with or without sound; movable (e.g., by an operator interacting with a touchscreen) or in a fixed location; etc.) to communicate the information described in these examples.

Examples of PCC system operator notifications are now described with reference to FIGS. 4-27, which are screen shots depicting various display states in accordance with aspects of the present disclosure. Many of the display states include operator notifications comprising a function tell-tale 162 that indicates a basic status of the PCC system. Many of the display states also include operator notifications comprising a function-specific view 164 that provides more detailed information, if available, about the PCC system. Many of the display states also include home screen information 302, 304 to give the operator basic information about road conditions, time of day, general system alerts, and the like.

Figure 4:
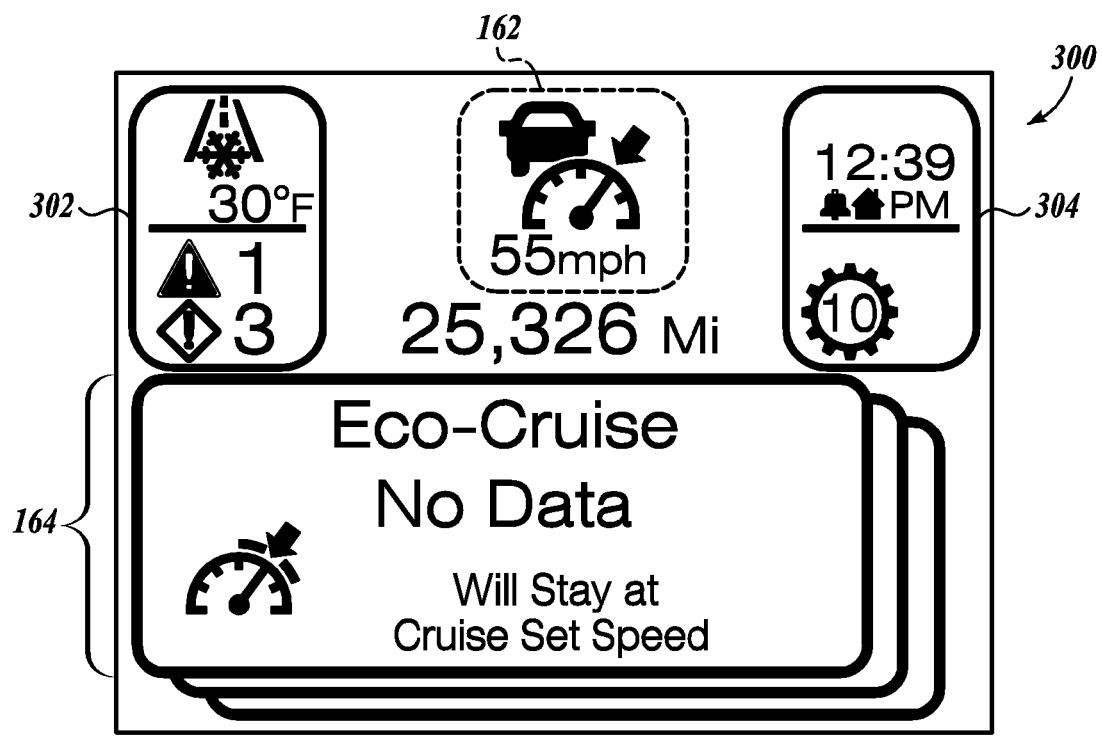
FIGS. 4-27 are screen shots of illustrative operator notifications that may be generated by a display device of a computing system such as the on-board vehicle computer system of FIG. 1.

In the display state 300 shown in FIG. 4, the function tell-tale 162 indicates that the base cruise control system is active with cruise set speed of 55 mph. However, the function-specific view 164 includes a message that indicates that sufficient PCC system data is not available and that the truck will remain at the cruise set speed without PCC-generated speed adjustments. This message may be displayed, for example, when an operator attempts to activate the PCC system when PCC State is in an error condition, such as where vehicle position is unavailable, map location is unavailable, roadway slope information is unavailable, or a predicted path is unavailable.

Figure 5A:
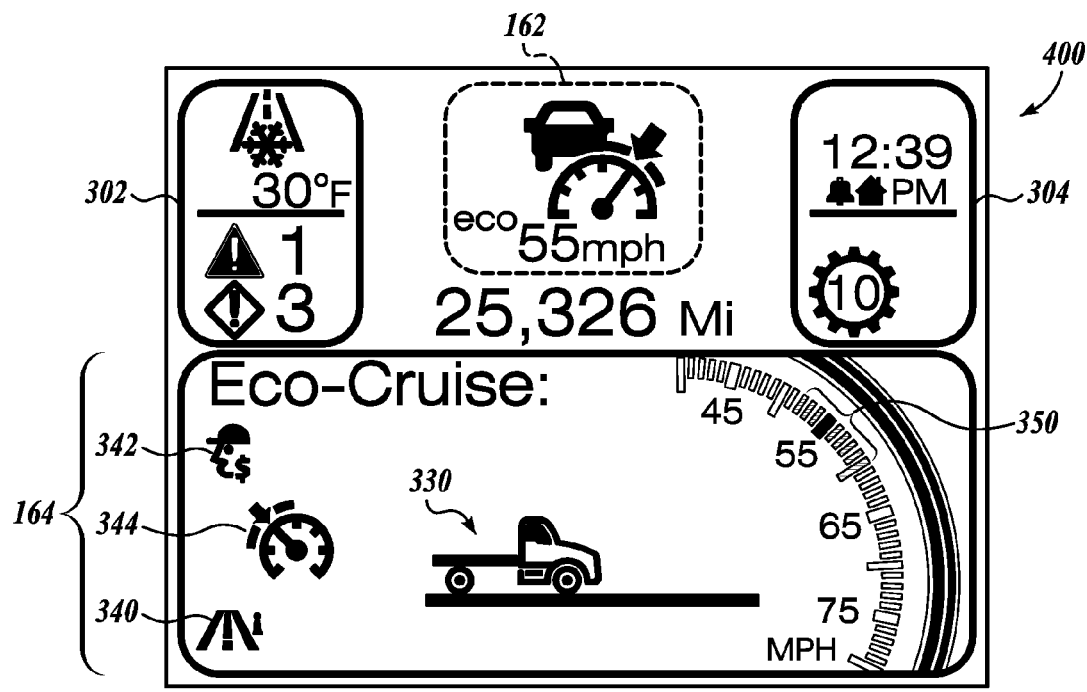
Figure 5B:
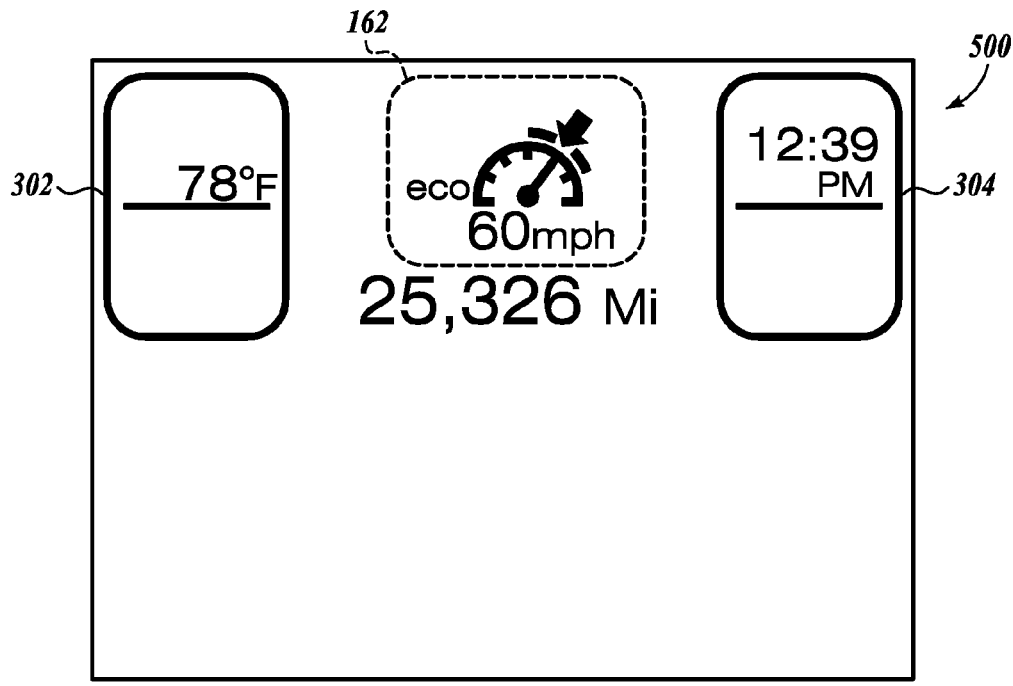

In the display state 400 shown in FIG. 5A, the function tell-tale 162 indicates that the PCC system has been enabled (via the "ECO" symbol). The function-specific view 164 includes a speedometer graphic 350 that indicates the potential positive and negative speed offsets that are currently in effect within the PCC system. The function-specific view 164 also includes a slope diagram 330 that indicates the current slope and future slope of the roadway on which the truck is traveling, as well as additional icons such as a road information icon 340, a driver rewards icon 342, and a cruise control icon 344. In at least one embodiment, the display state 400 occurs when Vehicle Mode=Driving, PCC State=Fully Active, Current Slope=Flat, and Next Slope=Flat. In FIG. 5B, the function tell-tale 162 in the display state 500 provides another example of how the PCC system can indicate that the PCC Set Speed is equal to the cruise control set speed (e.g., as defined by the variable CC Set Speed), without displaying a function-specific view 164.

Figure 6A:
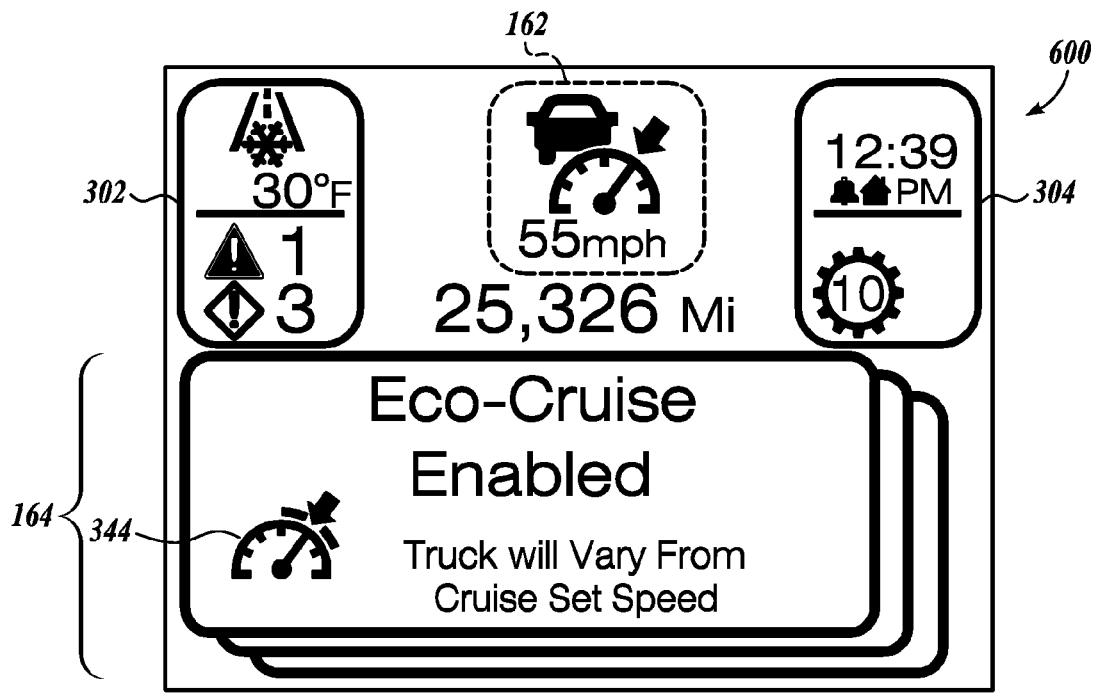
Figure 6B:
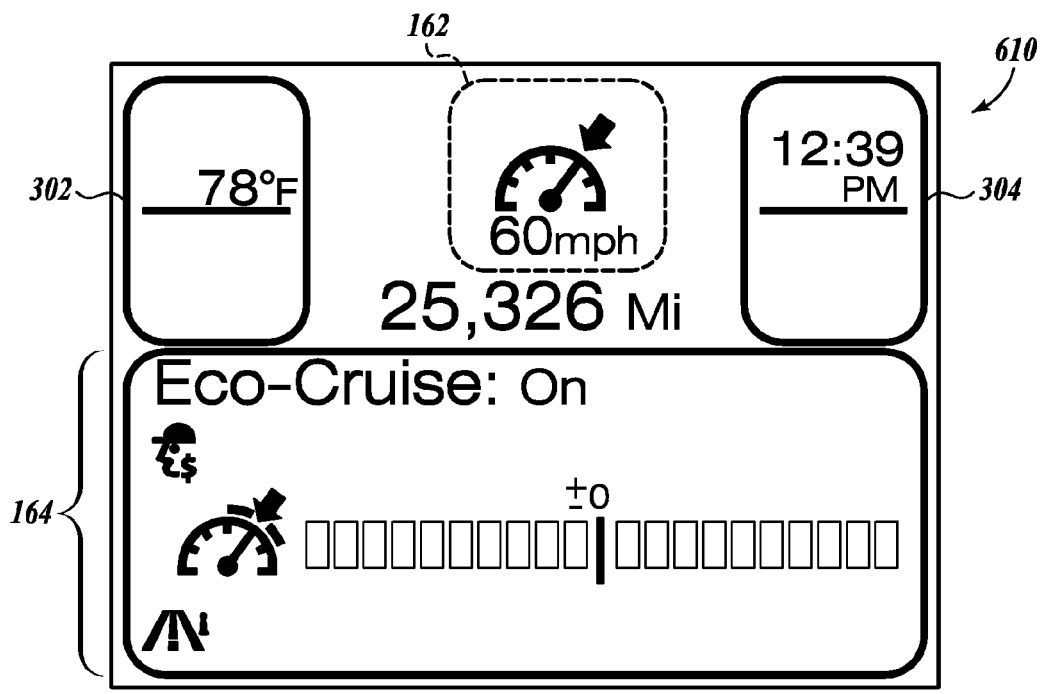
Figure 7A:
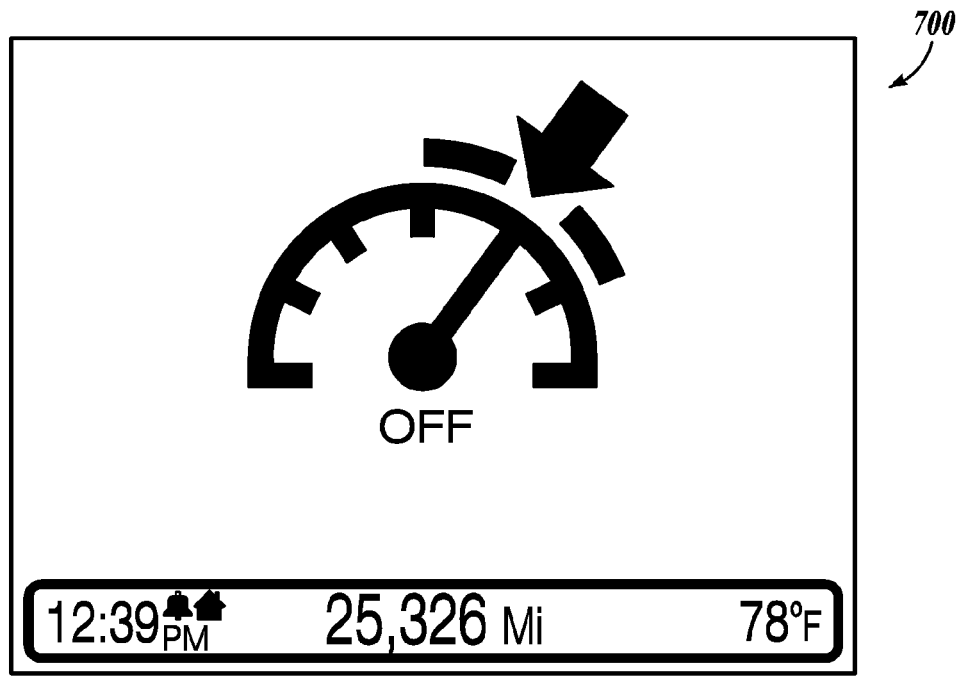
Figure 7B:
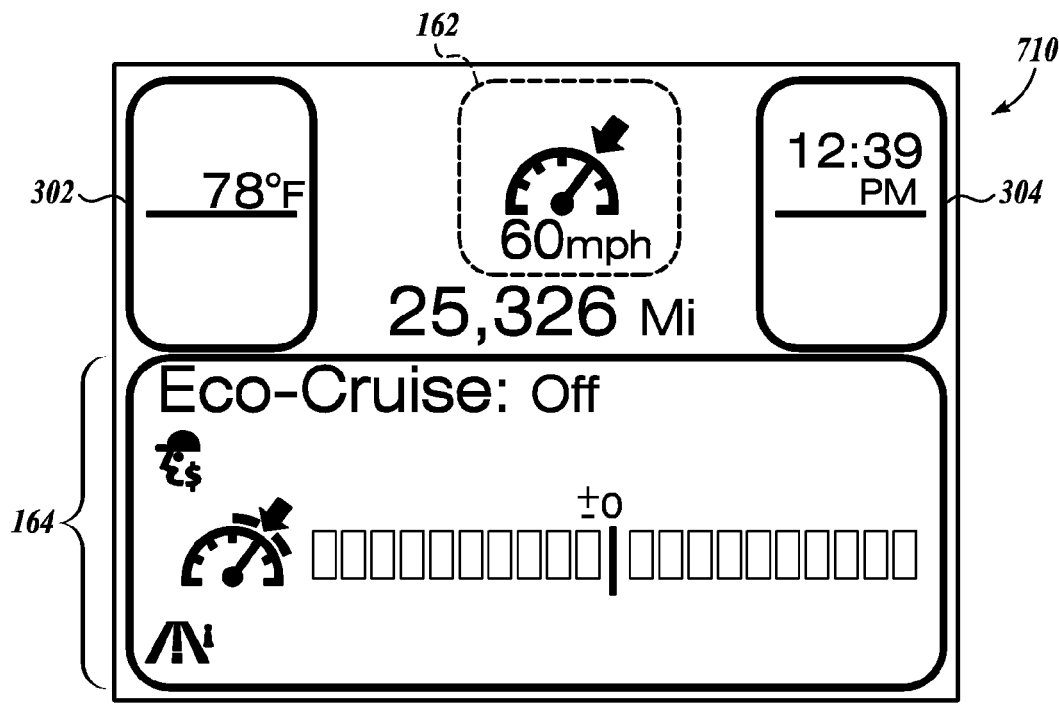
Figure 8A:
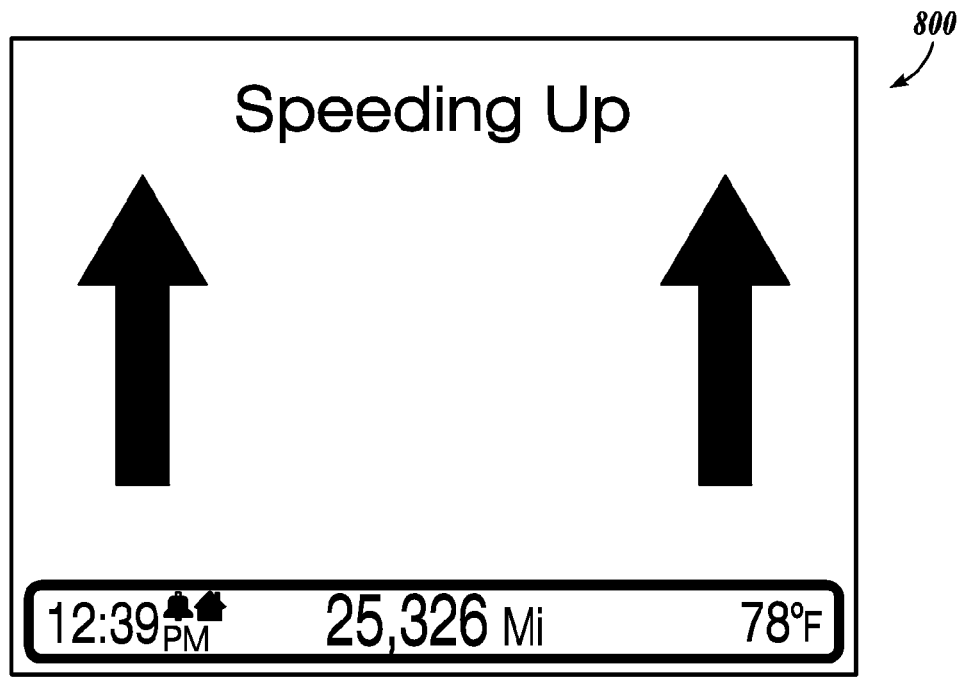
Figure 8B:
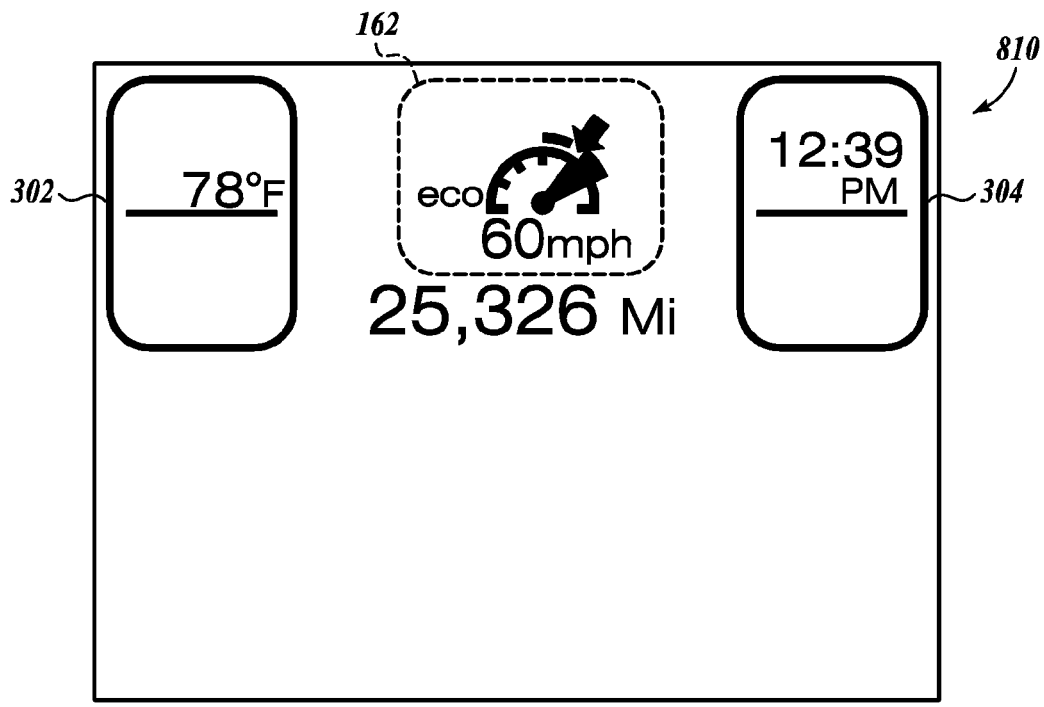
Figure 9A:
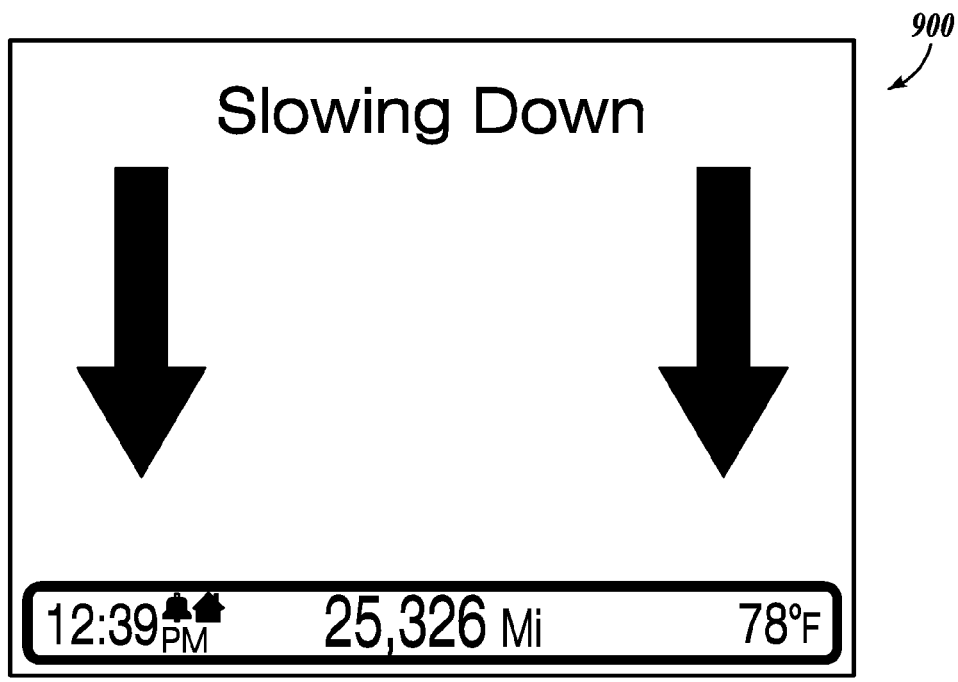
Figure 9B:
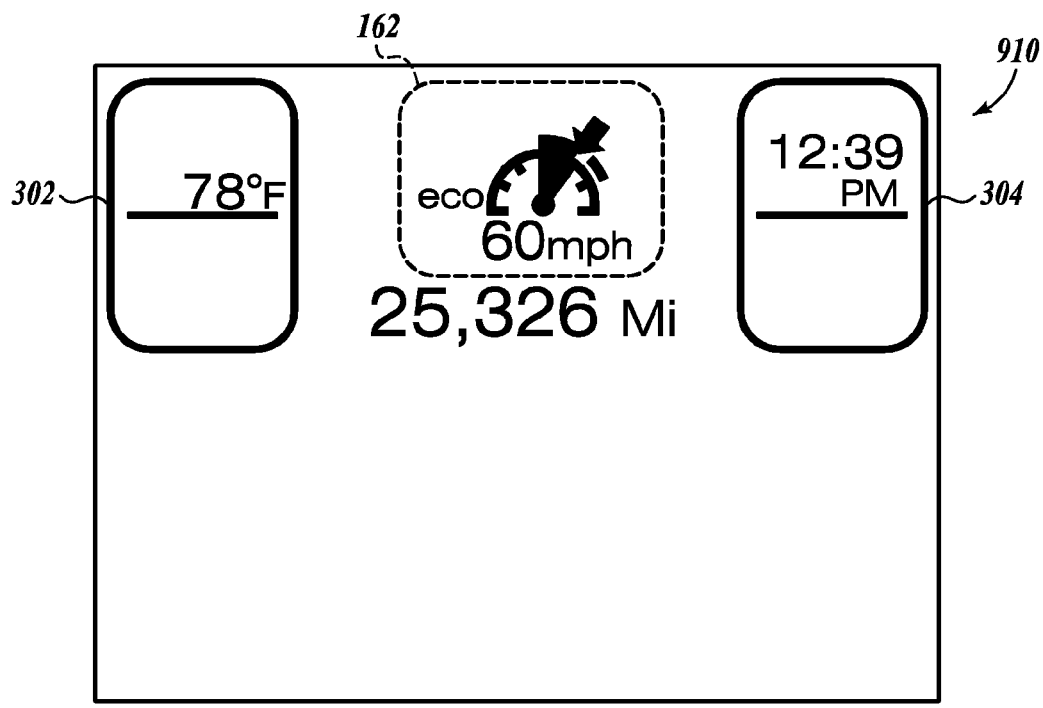
Figure 10:
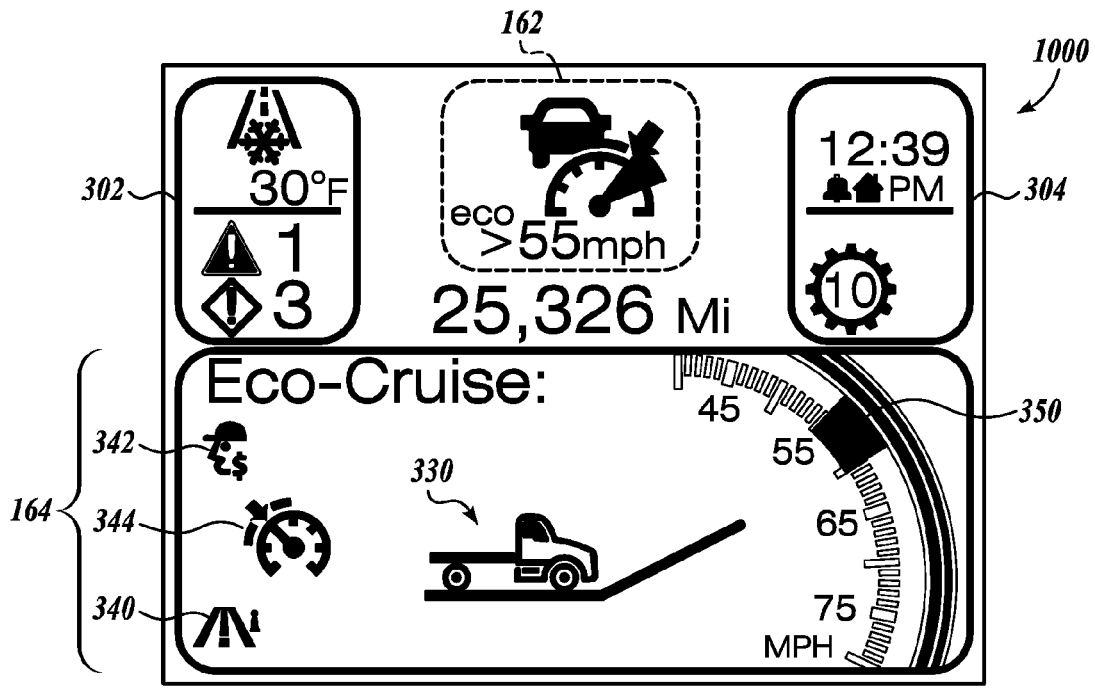

In the display state 600 shown in FIG. 6A, the function tell-tale 162 indicates that the base cruise control system is on, but it has not been updated to indicate that the PCC system is active. However, the function-specific view 164 includes a message that indicates the activation of the PCC system and that the truck may vary from the cruise set speed with PCC speed adjustments. To avoid unnecessary feedback as the PCC system is activated and deactivated during operation of the truck, in one implementation the display state 600 occurs on the first occurrence of this transition since the last key-on event for the truck. As an alternative to the display state 600, the display state 610 shown in FIG. 6B also indicates that the PCC system has been activated (with the text "Eco-Cruise: On") in an alternative arrangement within the function-specific view 164. The messages depicted in display states 600 and 610 may be displayed, for example, when Cruise Control State=ON and the PCC system is active (e.g., when PCC State transitions to a Fully Active state).

An operator notification also can be used to indicate a transition from an active state to an inactive state. In the display state 700 shown in FIG. 7A, a large PCC icon accompanied by the word "OFF" is used to indicate that the PCC system has transitioned to an inactive state. As an alternative to the display state 700, the display state 710 shown in FIG. 7B also indicates that the PCC system has been deactivated, with the text "Eco-Cruise: Off" appearing in the function-specific view 164.

In an active PCC state, a display state can be used to indicate a speed change event that is attributed to the PCC system. In the display states 800 and 900 shown in FIGS. 8A and 9A, respectively, illustrative speed change notifications are depicted comprising large arrows pointing up or down accompanied by the words "Speeding Up" or "Slowing Down," respectively, to indicate a speed change event caused by the PCC system. In the display states 810 and 910 shown in FIGS. 8B and 9B, other illustrative speed change notifications are depicted comprising a function tell-tale 162 that indicates an increase in speed and a decrease in speed, respectively. In some embodiments, the display states 800, 810, 900, and 910 occur when PCC State is Fully Active and PCC Set Speed is greater than or less than Vehicle Speed, respectively.

The examples shown in FIGS. 8A, 8B, 9A, and 9B omit some information shown in other examples described herein (e.g., FIGS. 10 and 11), which can help to remove visual noise and clarify the communication of the change in vehicle speed. On the other hand, additional information (e.g., terrain information) may help the operator to better understand the behavior of the truck and the operation of the PCC system. Either approach can be desirable, depending on the context of the communication.

Figure 11:
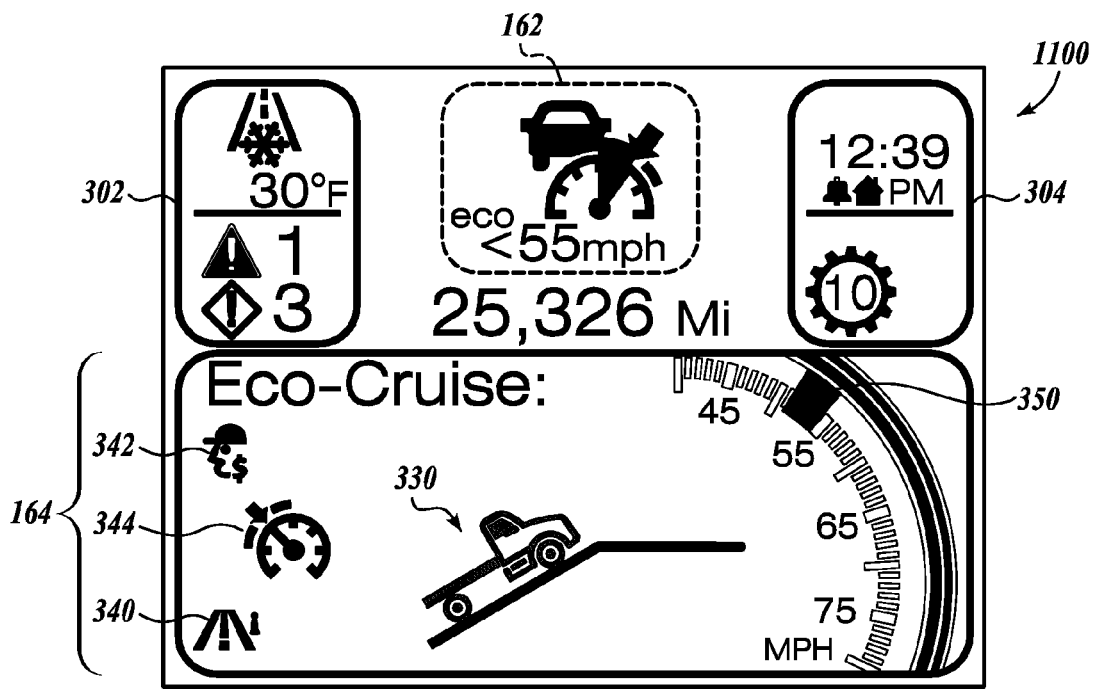

An operator notification also can be used to indicate upcoming terrain features that may affect the vehicle speed set by the PCC system. For example, in the display states 1000, 1100, and 1700 shown in FIGS. 10, 11, and 17, respectively, the function tell-tale 162 and the speedometer graphic 350 have been updated to indicate that the PCC system is causing the truck to speed up (FIGS. 10 and 17) or slow down (FIG. 11).

In the display states 1000 and 1700, the speedometer graphic 350 has been updated to indicate that the truck is speeding up from 55 mph. In the display state 1000, the slope diagram 330 has been updated to indicate an upcoming hill climb. In at least one embodiment, the display state 1000 occurs when Vehicle Mode=Driving, PCC State=Fully Active, Current Slope=Flat, and Next Slope=Up. In the display state 1700, the slope diagram 330 has been updated to indicate the upcoming end of a descent. In at least one embodiment, the display state 1700 occurs when Vehicle Mode=Driving, PCC State=Fully Active, Current Slope=Down, and Next Slope=Flat.

In the display state 1100, the speedometer graphic 350 has been updated to indicate that the truck is slowing down from 55 mph, and the slope diagram 330 has been updated to indicate that a current hill climb is ending soon, thereby providing feedback to the truck operator to indicate why the truck is slowing down. In at least one embodiment, the display state 1100 occurs when Vehicle Mode=Driving, PCC State=Fully Active, Current Slope=Up, and Next Slope=Flat. The display states 1000, 1100, and 1700 shown in FIGS. 10, 11, and 17, respectively, provide feedback to the truck operator to indicate both a change in speed caused by the PCC system and a reason why the change is occurring.

An operator notification also can be used to indicate upcoming terrain features that are being monitored by the PCC system even if the vehicle speed will not be affected by the PCC system. For example, in the display states 1200, 1300, 1400, 1500, and 1600 shown in FIGS. 12-16, respectively, the function tell-tale 162 and the speedometer graphic 350 indicate that no speed change will take place in view of current and/or upcoming terrain features. The display states shown in FIGS. 12-16 provide feedback to the truck operator to indicate both a steady speed and reasons (e.g., depictions of current and future terrain features that are being monitored by the PCC system) why no change is occurring.

Figure 12:
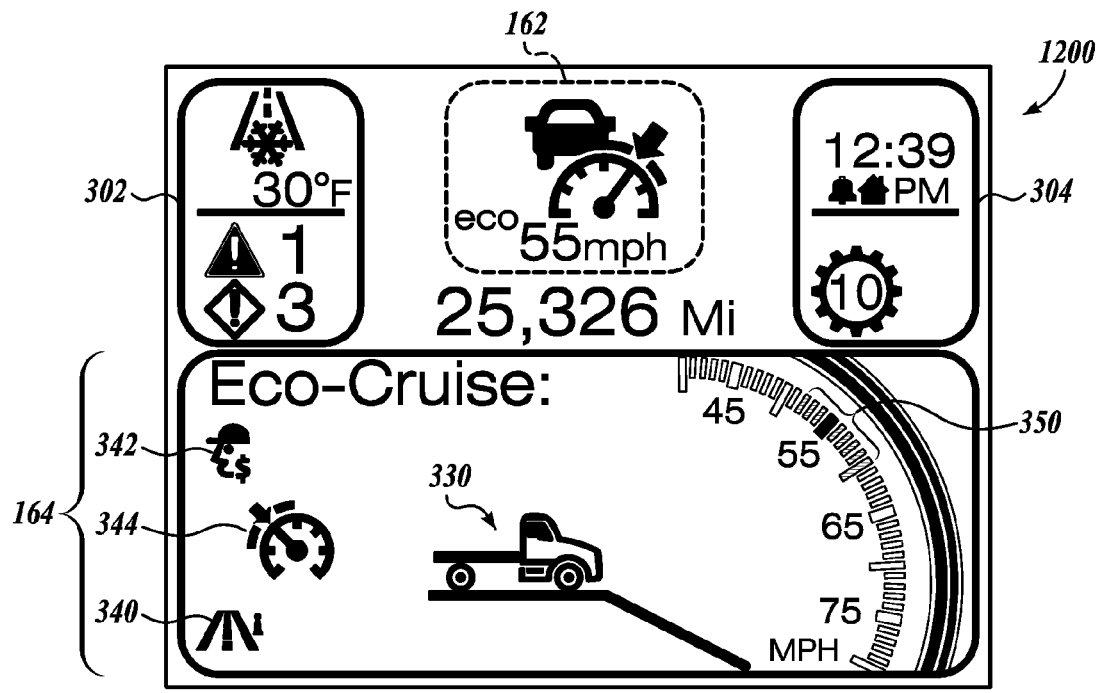
Figure 13:
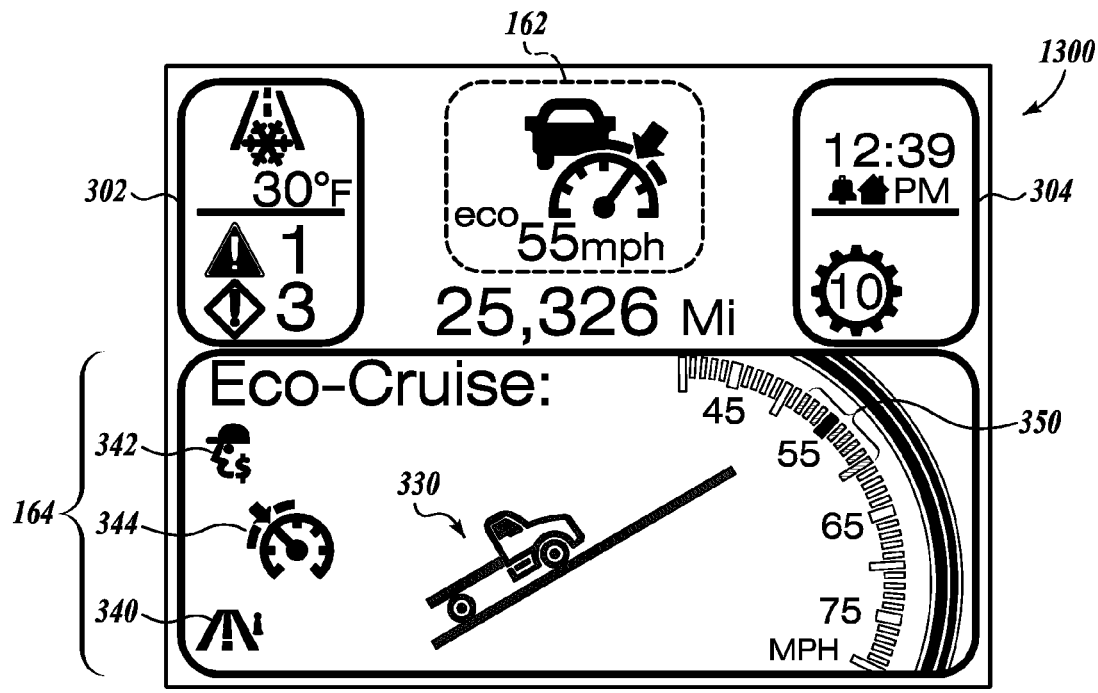
Figure 14:
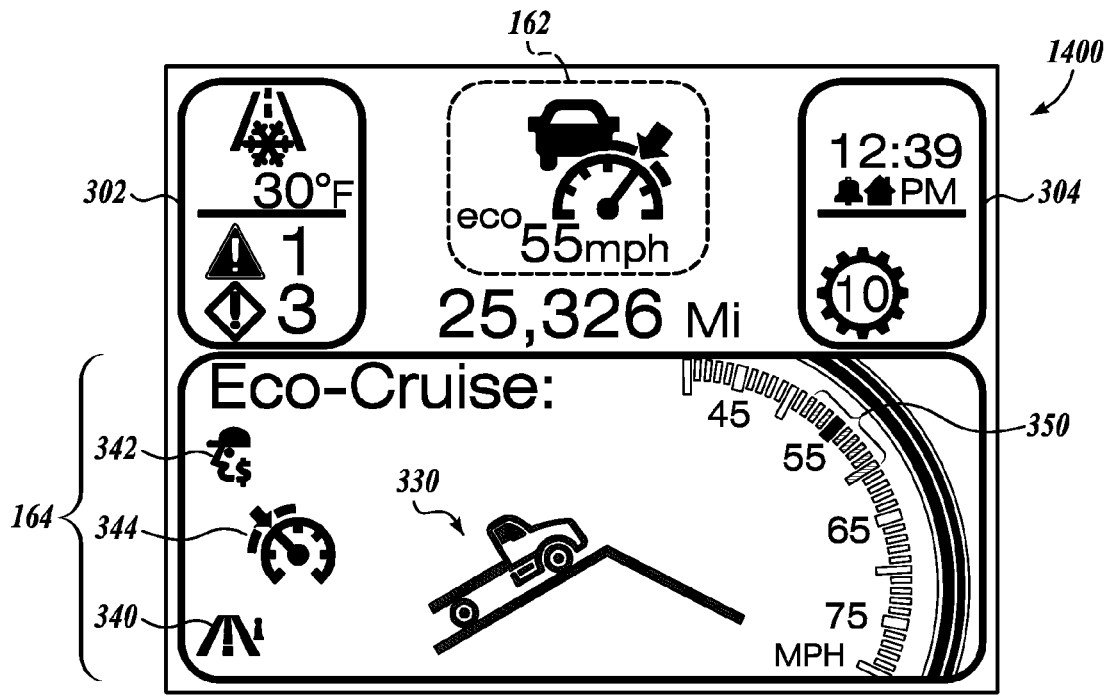
Figure 15:
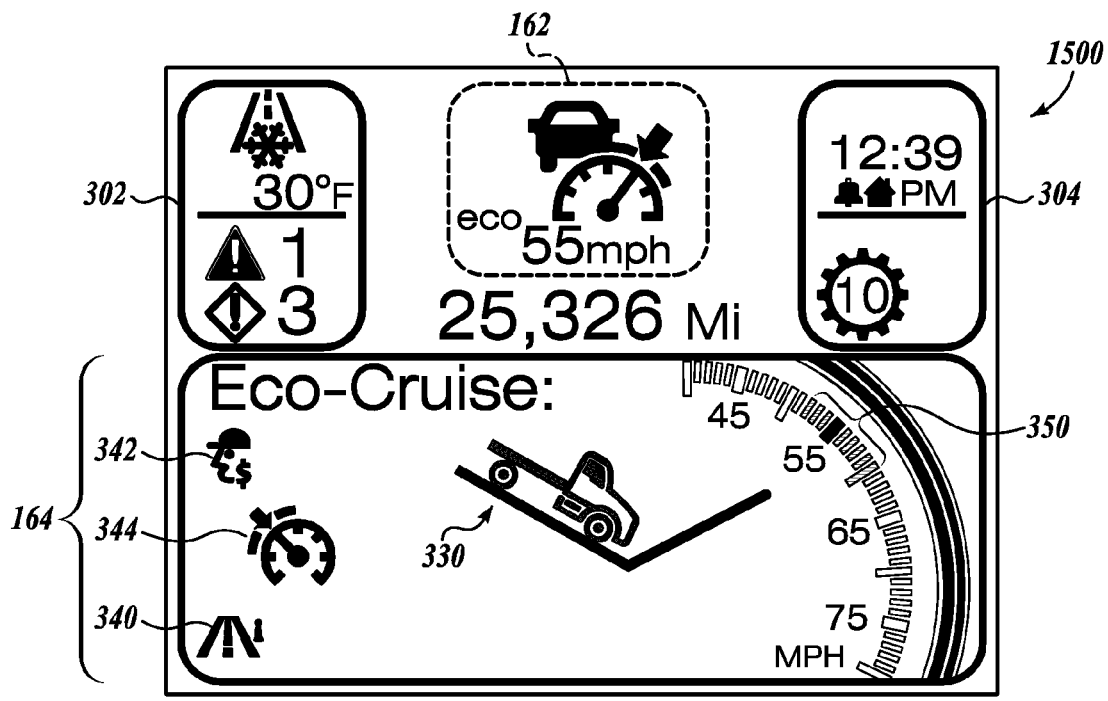
Figure 16:
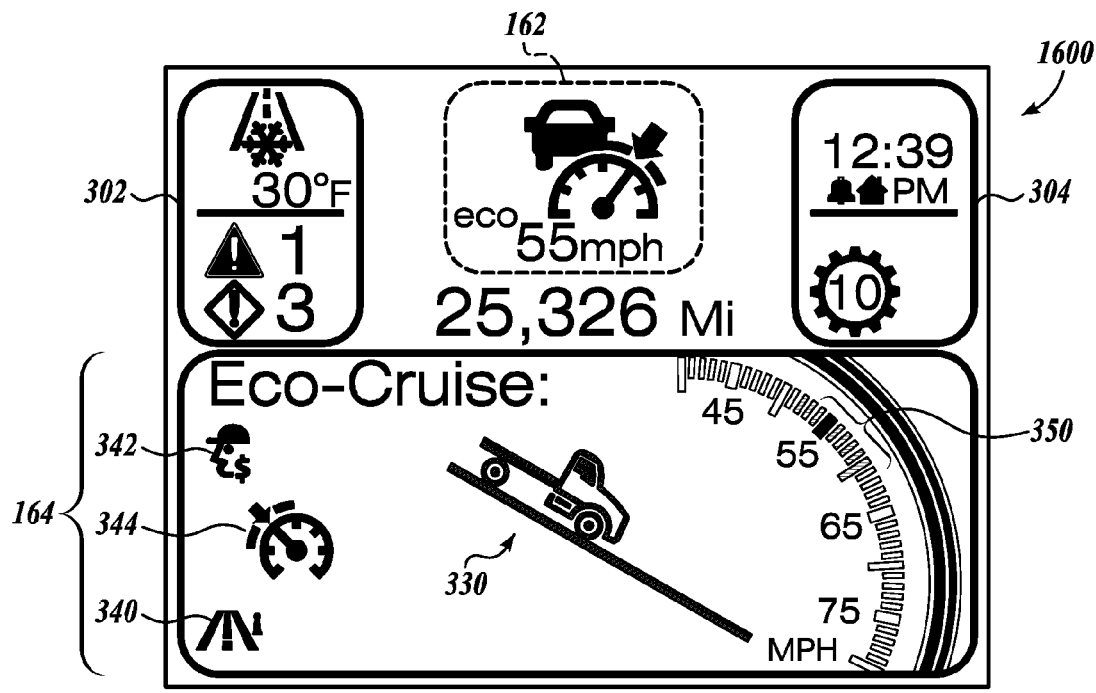
Figure 17:
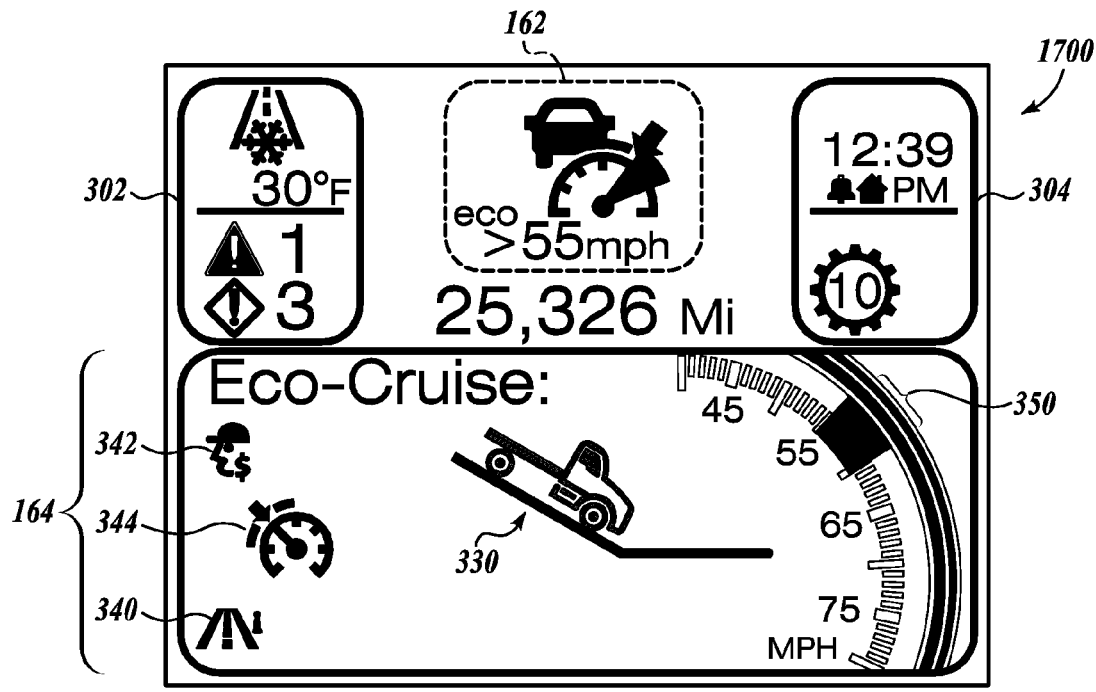
Figure 18:
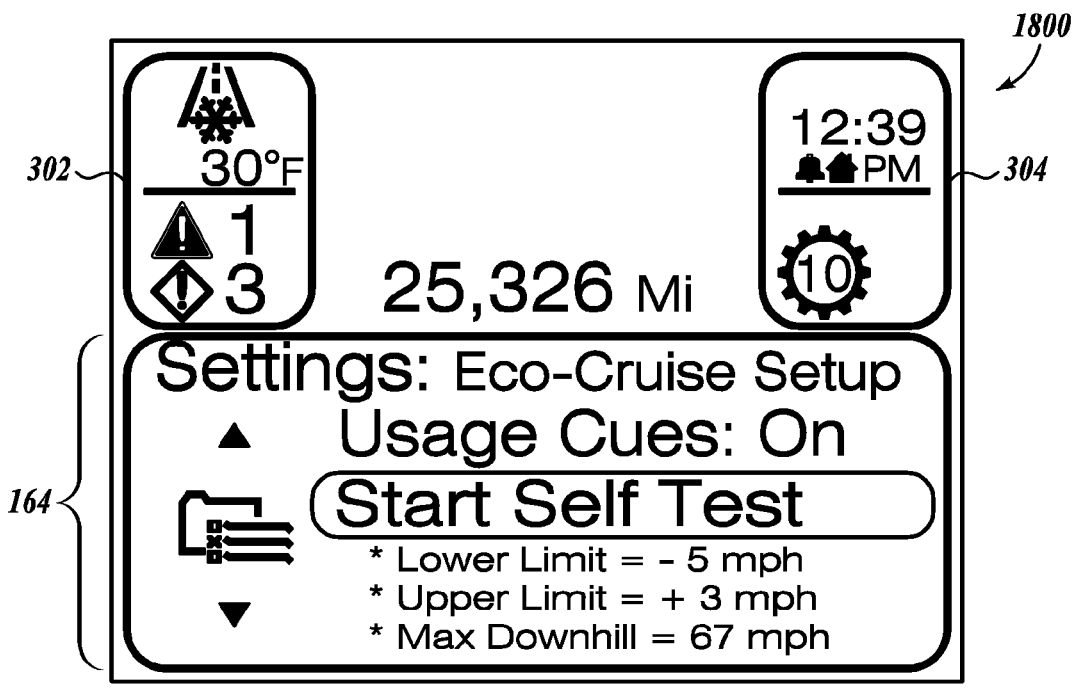
Figure 19:
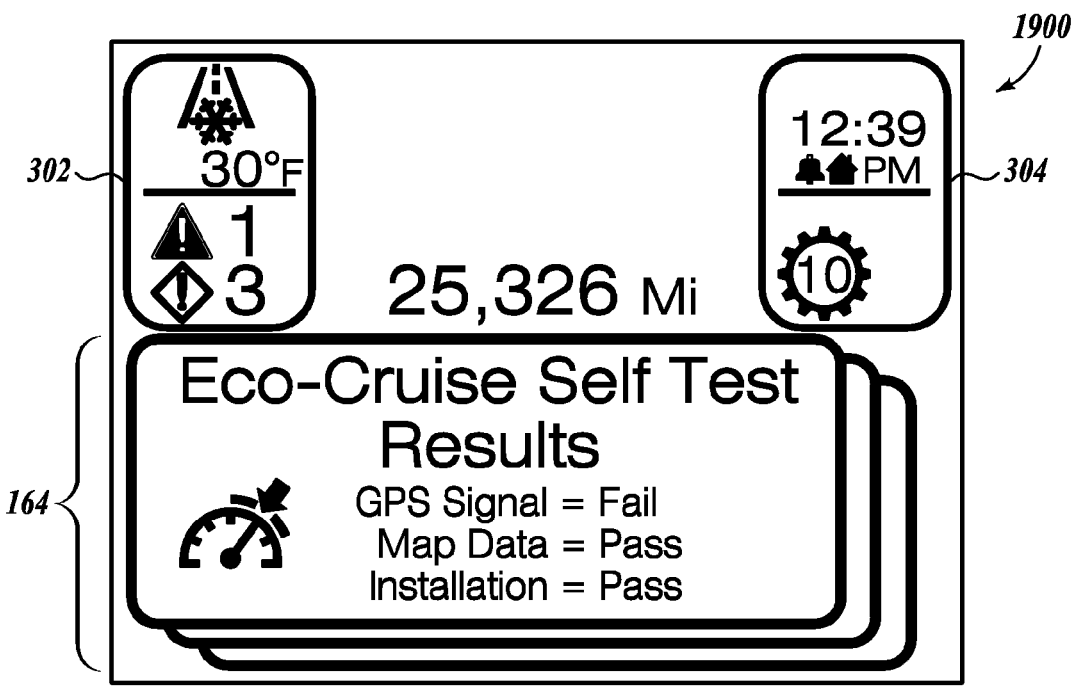

The slope diagram 330 depicts an upcoming downhill slope in FIG. 12, an ongoing hill climb in FIG. 13, an upcoming hill apex in FIG. 14, an upcoming valley in FIG. 15, and an ongoing descent in FIG. 16. In at least one embodiment, the display states 1200, 1300, 1400, 1500, and 1600 occur when Vehicle Mode=Driving, PCC State=Fully Active, and the following conditions apply: Current Slope=Flat and Next Slope=Down (FIG. 12); Current Slope and Next Slope=Up (FIG. 13); Current Slope=Up and Next Slope=Down (FIG. 14); Current Slope=Down and Next Slope=Up (FIG. 15); and Current Slope and Next Slope=Down (FIG. 16).

Figure 20:
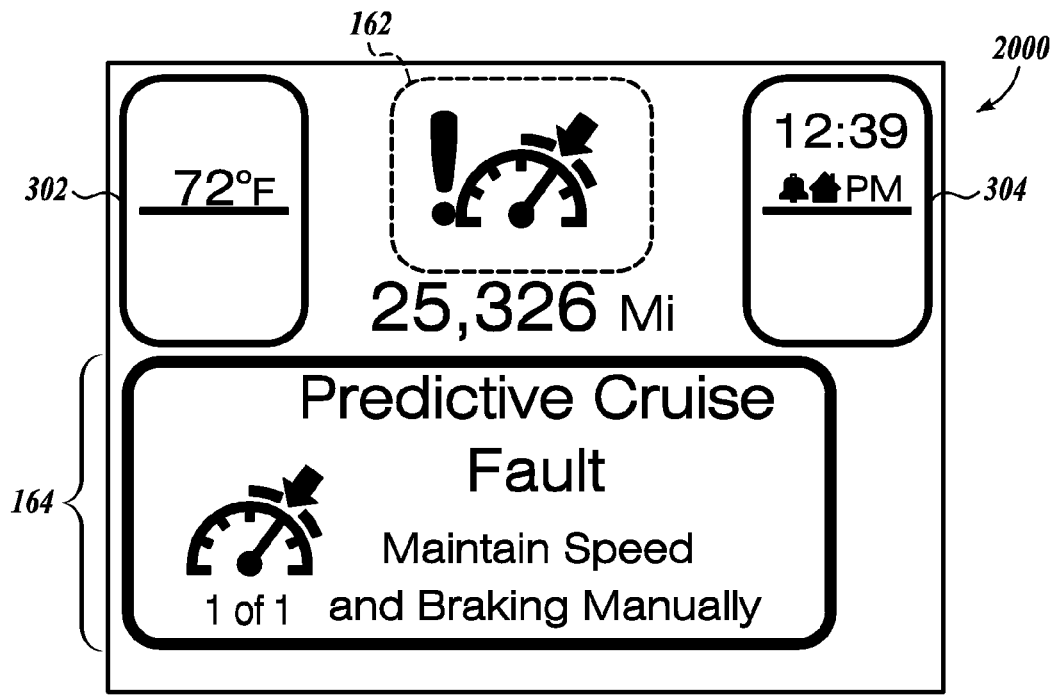

FIGS. 18-21 depict display states 1800, 1900, 2000, and 2100, respectively, that may be presented when the vehicle is parked (e.g., as indicated by Vehicle Mode=Parked) in at least one implementation. (Display state 2000 may also be presented when the vehicle is in motion.) In the display states 1800 and 2000, the function-specific view 164 includes features of a PCC system setup utility with functionality for adjusting user settings and performing system diagnostics via a "System Self Test" function. In display state 1800, the "Start Self Test" function is selected, as indicated by the rounded rectangle in the function-specific view 164, which also includes additional PCC system information such as a lower speed adjustment limit ("Lower Limit=−5 mph"), an upper speed adjustment limit ("Upper Limit=+3 mph"), and a maximum downhill speed ("Max Downhill=67 mph"). In display state 1900, results of the self-test are displayed. As shown, the display state 1900 includes a message that indicates that the GPS signal test failed, which means that PCC functionality may not be available. The display state 2000 in FIG. 20 may be used in the event of the PCC system fault detected in FIG. 20, or some other fault. As shown in FIG. 20, the truck operator is advised to "maintain speed and braking manually" to manage vehicle speed in the absence of active PCC functionality. The display state 2000 can be presented when the truck is in motion or when the truck is parked, and can be dismissed as desired by the operator in order to minimize visual clutter.

Figure 21:
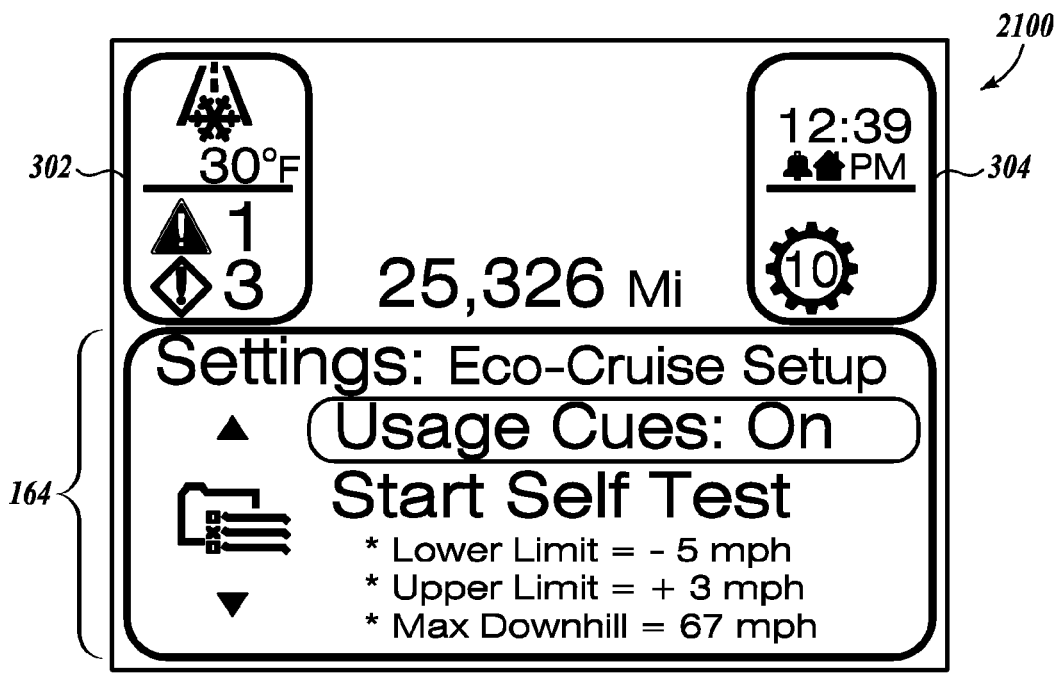
Figure 22A:
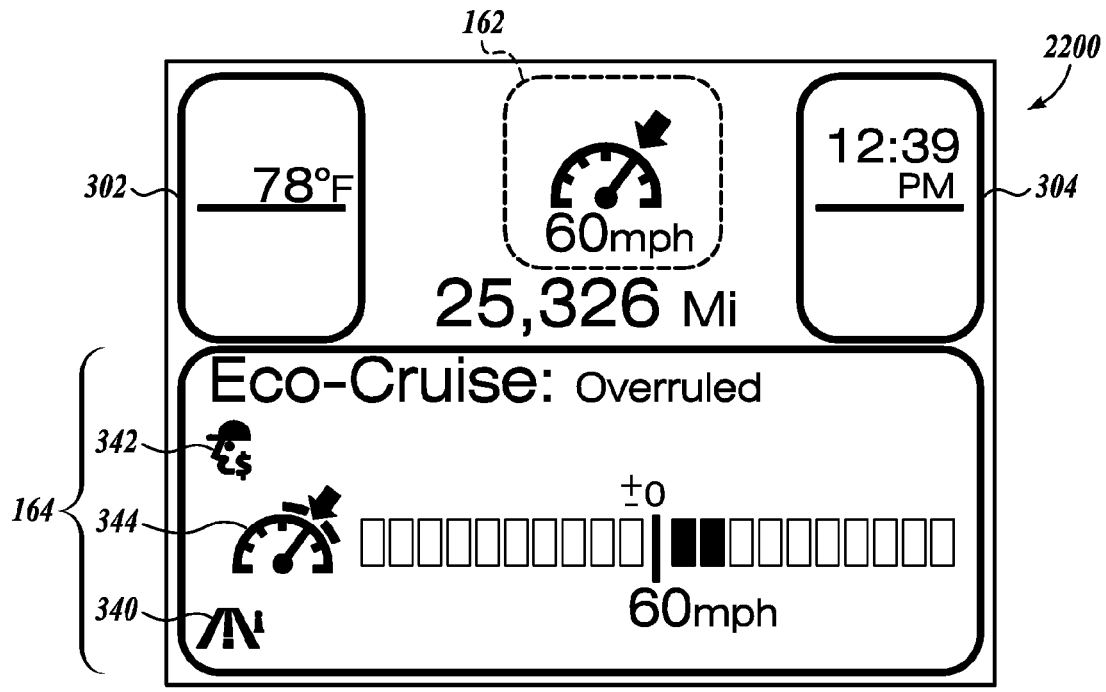
Figure 22B:
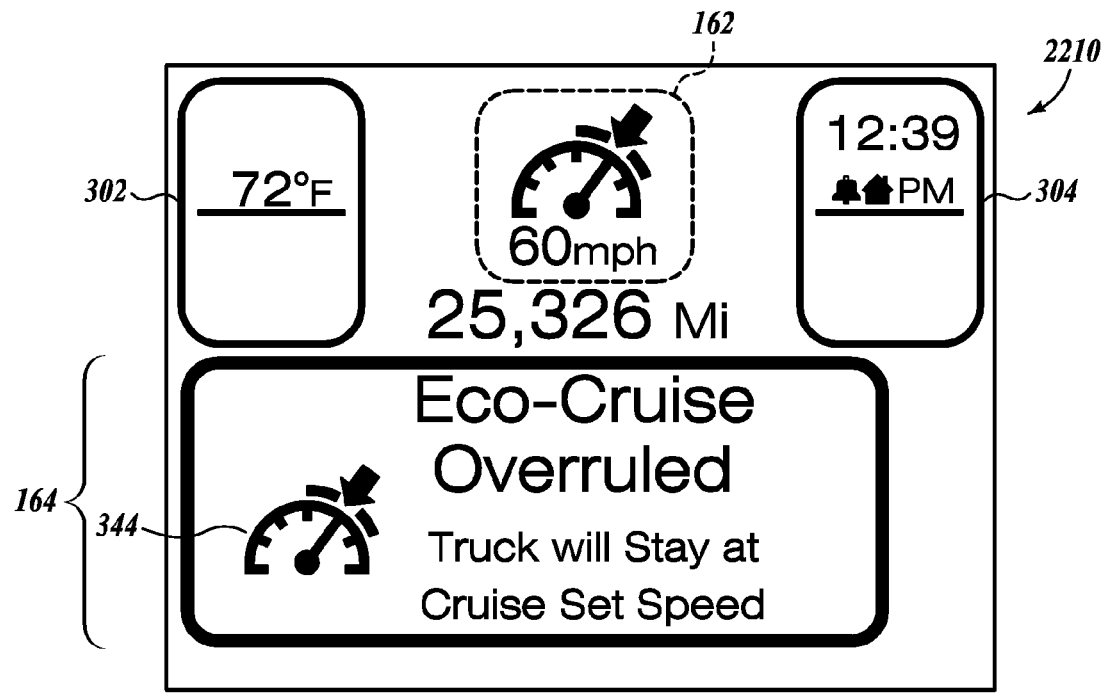

In the example shown in FIG. 21, the Usage Cues settings function is selected, indicating that Usage Cues are currently on. In at least one implementation, this setting means that Enhanced Driver Feedback=True. Additional settings shown in FIG. 21, such as the Lower Limit and Upper Limit, can be similarly selected and adjusted, as desired. In some implementations, settings such as the Lower Limit, Upper Limit, Maximum Downhill Speed, and other settings may be constrained or fixed.

In some embodiments, if the PCC system is active, it may be in one of several possible control bands with a range of available vehicle speed adjustments, including an upper limit and a lower limit. The variable PCC Level can be used to indicate whether the PCC system is active, and if so, the current control band. In at least one embodiment, PCC Level can be set at 0, 1, 2, or 3. Overruling the PCC system or deactivating the PCC system sets PCC Level=0. The display state 2200 shown in FIG. 22A includes the message "Eco-Cruise: Overruled" in the function-specific view 164 to indicate that the PCC system has been overruled by the operator (PCC Overruled By Driver=True), while the function tell-tale 162 indicates that the base cruise control remains active with a cruise set speed of 60 mph.

The act of overruling the PCC system can be followed by a briefly displayed message (e.g., display state 2210 in FIG. 22B) to provide confirmation to the operator that the PCC system has been overruled. In at least one embodiment, the display state 2210 is not presented unless the variable PCC Settings Change Indication=True, indicating that a successful request has been made to overrule the PCC system. PCC Settings Change Indication also can indicate a change to the PCC Level, as described below.

In at least one embodiment, the feature that allows the operator to overrule operation of the PCC system can be enabled or disabled by an administrator, e.g., the vehicle owner. In addition, the amount of time that the operation of the PCC system has been overruled by the operator can be tracked (e.g., as a percentage of total driving time or of the time during which the base cruise control system is active) to determine, for example, whether additional coaching may be effective in increasing the amount of time that the operator allows the PCC system to remain active.

Figure 23A:
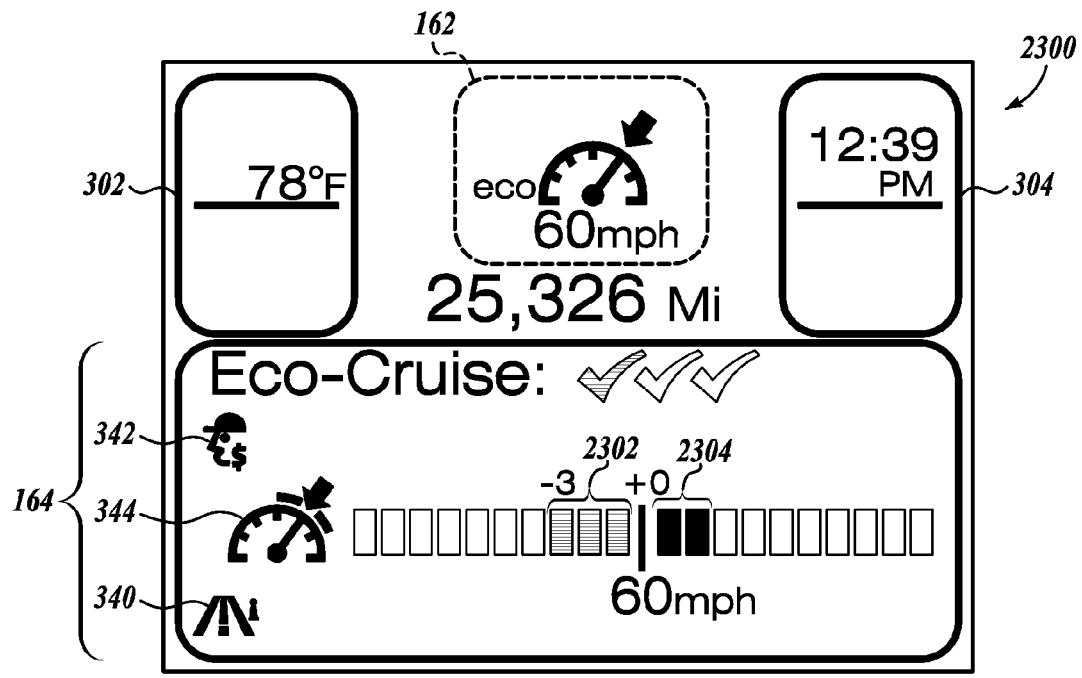
Figure 23B:
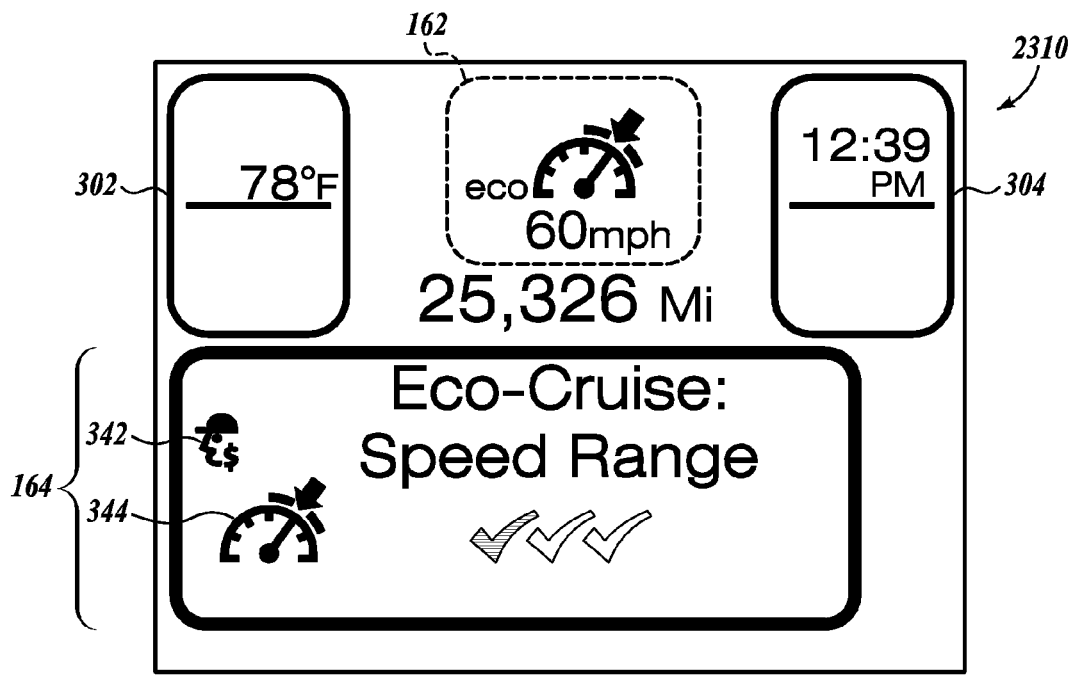
Figure 24A:
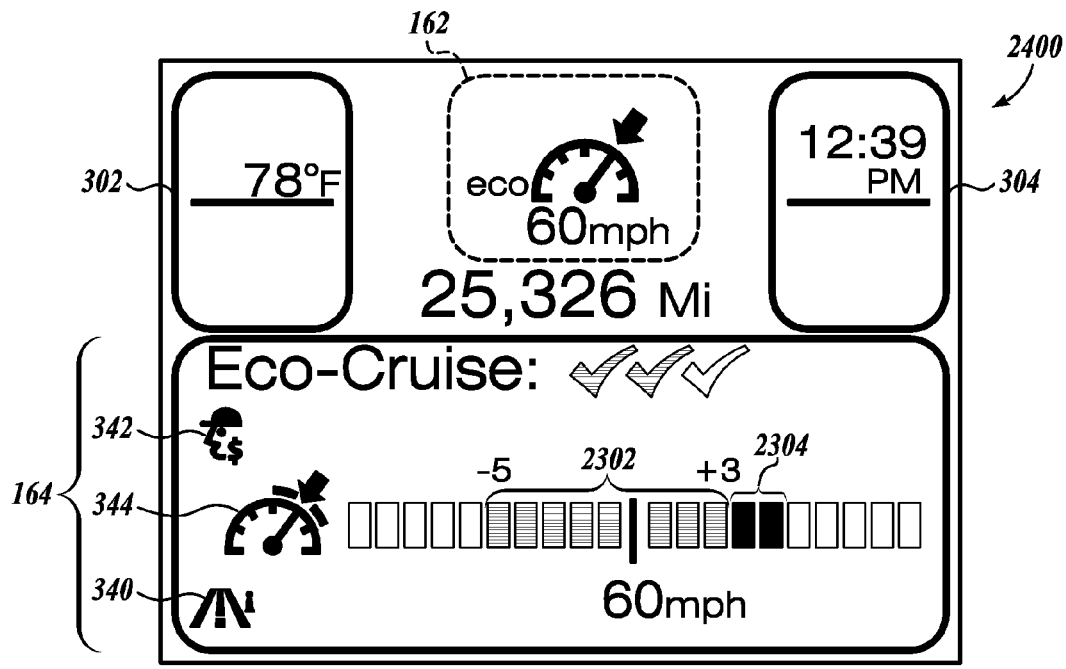
Figure 24B:
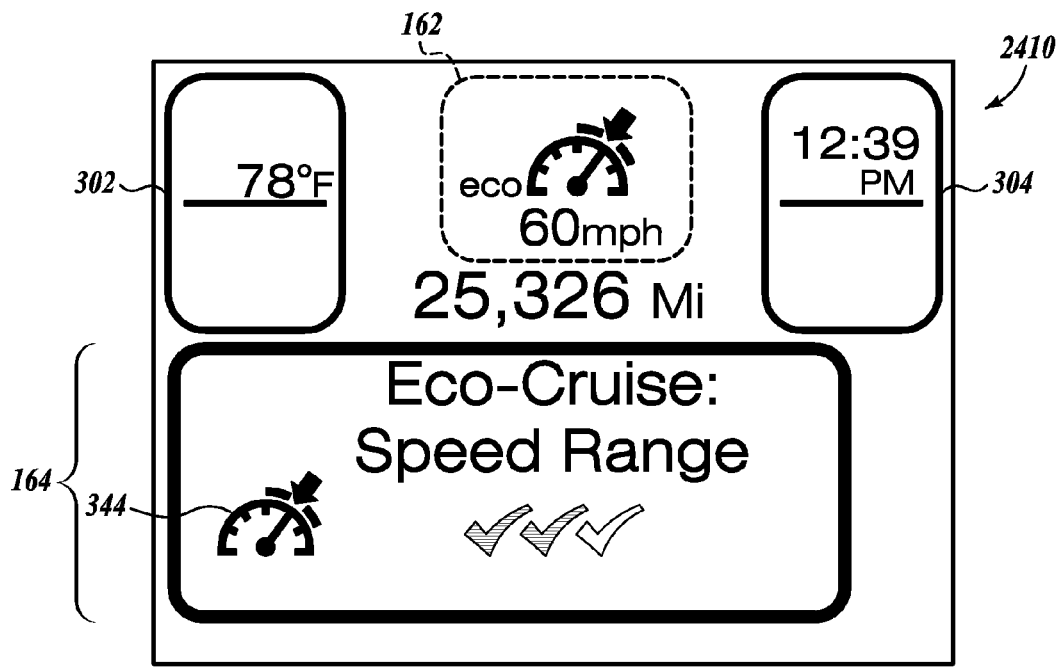
Figure 25A:
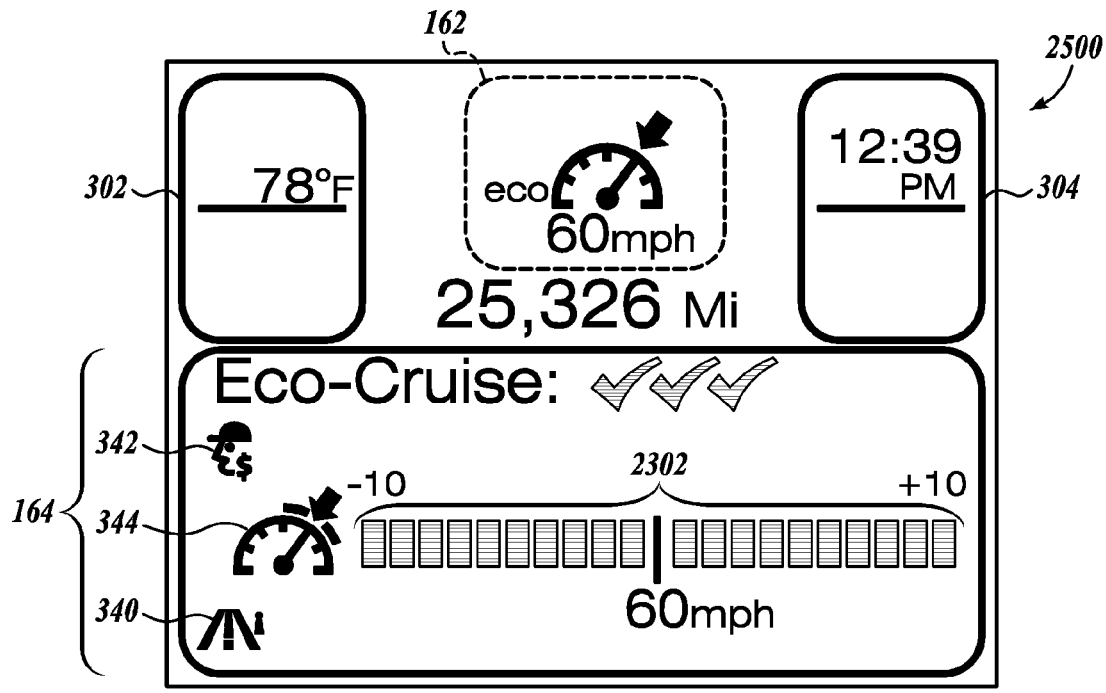
Figure 25B:
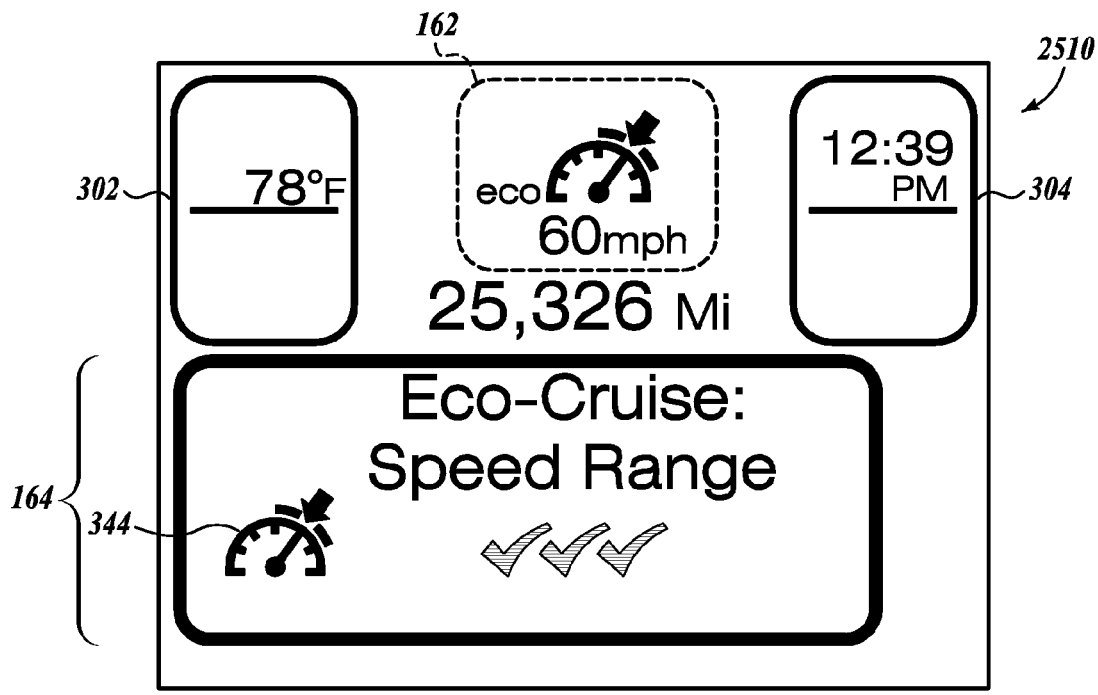
Figure 26:
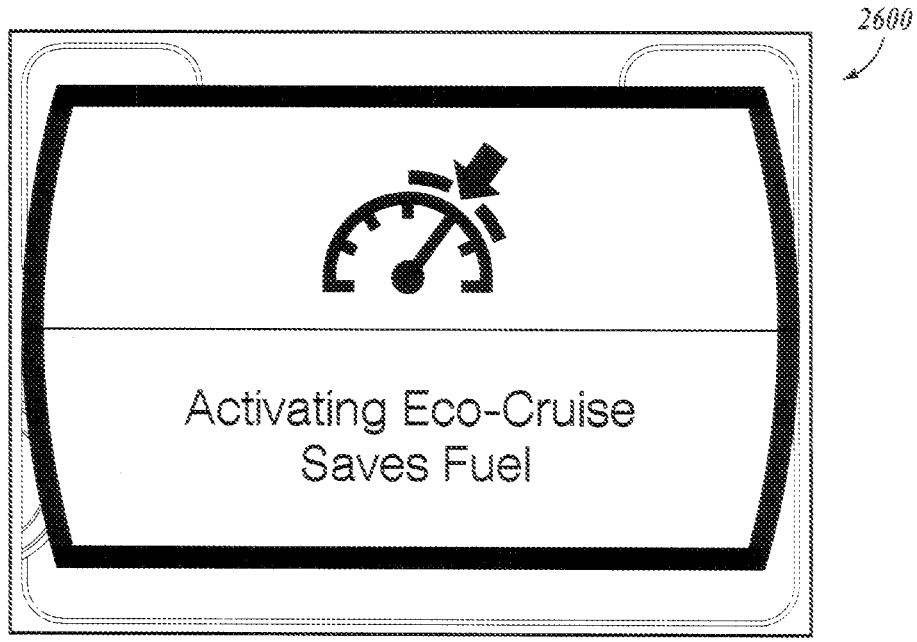
Figure 27:
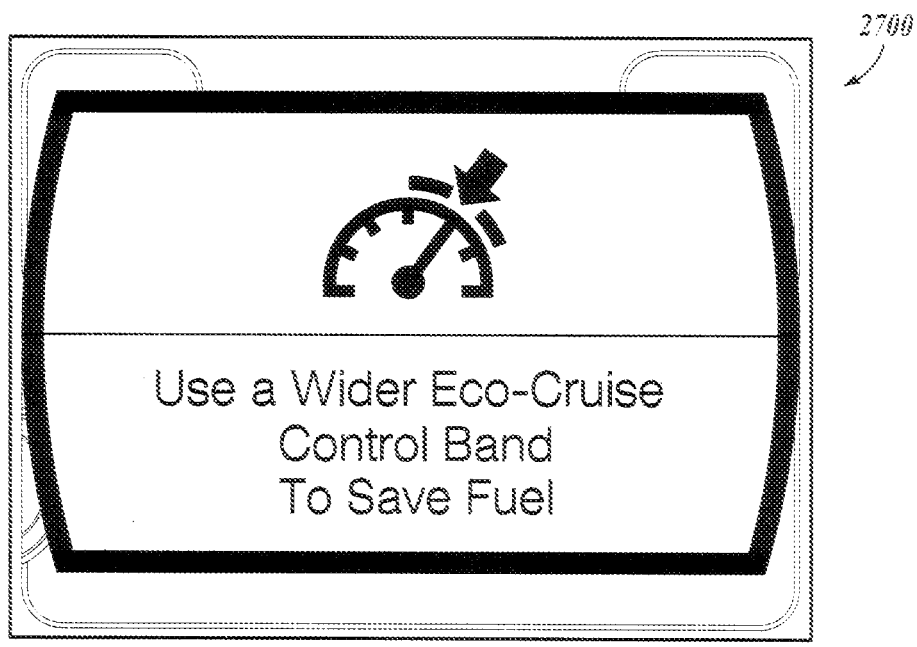

FIGS. 23A, 24A, and 25A show display states 2300, 2400, and 2500 associated with different control bands for an active PCC system. In the example shown in display state 2300 (PCC Level=1), one of three checkmarks is highlighted in the function-specific view 164 to indicate a first control band with a narrow speed adjustment range 2302 (e.g., from −3 mph to +0 mph). In the example shown in display state 2400 (PCC Level=2), two checkmarks are highlighted in the function-specific view 164 to indicate a second control band with a wider speed adjustment range 2302 (e.g., from −5 mph to +3 mph). The darker-shaded bars 2304 in FIGS. 23A and 24A indicate an additional downhill speed offset that is available beyond the fueled positive offset provided by the PCC system for the given control band. Alternatively, the downhill speed offset can be omitted.

In the example shown in display state 2500 (PCC Level=3), three checkmarks are highlighted in the function-specific view 164 to indicate a third control band with a still-wider speed adjustment range 2302 (e.g., from −10 mph to +10 mph). The act of transitioning to a specific control band can be followed by a briefly displayed message (e.g., display states 2310, 2410, and 2510 in FIGS. 23B, 24B, and 25B, respectively) to provide confirmation to the operator that a selected control band is now active. In at least one embodiment, the display states 2310, 2410, and 2510 are not presented unless the variable PCC Settings Change Indication=True, indicating that a successful request has been made to change the PCC Level.

In some embodiments, a driver performance assistant (DPA) system exhibits functionality that encourages operator behavior to provide benefits such as improved performance and improved fuel economy. The DPA system can be adapted to work with one or more vehicle subsystems, including a PCC system.

For example, a DPA system can provide notifications to encourage the operator to activate a PCC system that has been deactivated (e.g., where events have been missed in which the PCC system would have adjusted the vehicle speed). In the example shown in FIG. 26, the display state 2600 depicts an illustrative PCC activation reminder notification that includes a message (e.g., "Activating Eco-Cruise Saves Fuel") to encourage the operator to activate the PCC system. In at least one embodiment, this display state appears for a brief time (e.g., 5 seconds) to avoid unnecessarily distracting the driver. The conditions under which the display state 2600 appears may vary depending on system settings, user preferences, and the like.

In some embodiments, the illustrative PCC activation reminder notification depicted in the display state 2600 may depend on the following parameters: Driver Coaching Setting, Event Missed Count, and Event In Range. Driver Coaching Setting indicates whether coaching messages (e.g., PCC coaching messages and/or other coaching messages) are enabled or not. Event Missed Count is incremented (e.g., by a value of 1) if a speed change event occurs in which the PCC system would have changed the target vehicle speed from the cruise control set speed, but was unable to do so because PCC system functionality was disabled. Such an event can be referred to as a missed event. Event In Range indicates that the PCC system is set to change the cruise control set speed in the near future. In at least one embodiment, the display state 2600 is presented if Driver Coaching Setting is "enabled," Event Missed Count is greater than or equal to a threshold number (which may be customized), and Event In Range=True.

As another example, a DPA system can provide operator notifications to encourage the operator to select a wider control band if the PCC system would have adjusted the vehicle speed to a speed outside a narrower control band but within a wider control band. In the example shown in FIG. 27, the display state 2700 includes an illustrative control band adjustment notification comprising a message (e.g., "Use a Wider Eco-Cruise Control Band to Save Fuel") to encourage the operator to user a wider control band (e.g., with a higher positive offset and/or a lower negative offset). In at least one embodiment, the display state 2700 can be presented ahead of an upcoming speed change event in which the PCC system would adjust the vehicle speed to a speed outside the current, narrower control band but within a wider control band.

The control band adjustment notification depicted in the display state 2700 may depend on the following parameters: Non-Optimal Event Count and Non-Optimal Event In Range. For example, Non-Optimal Event Count can be incremented (e.g., by a value of 1) if a speed change event occurs in which the PCC system would have adjusted the target vehicle speed from the set speed (e.g., by lowering it), but was unable to do so because the adjusted speed would be outside (e.g., lower than) a currently active control band. Such an event can be referred to as a Non-Optimal Event. Non-Optimal Event In Range indicates that the PCC system is set to adjust the target vehicle speed from the set speed to a speed outside (e.g., lower than) a currently active control band in the near future. In this example, the display state 2600 can be presented if Non-Optimal Event Count is greater than or equal to a threshold number (which may be customized), and Non-Optimal Event In Range=True.

To provide an additional level of control over PCC messages in a DPA system, an additional parameter (e.g., $Enable_{PCC\ Reminder}$) can be used to indicate whether or not feedback (e.g., reminders) related to the PCC system are to be displayed. In this way, coaching messages can be generally enabled within the DPA system, while still allowing the ability to turn PCC system feedback messages on or off. Some parameters (e.g., Event Missed Count, Non-Optimal Event Count) may be reset (e.g., to a default value such as 0) if the DPA system is reset, which can prevent reminders relating to such parameters from occurring too frequently.

Illustrative Control Logic

In this section, illustrative control logic for a PCC system with advanced operator control and feedback cabilities is described. The control logic described in this section can be implemented in a variety of hardware, software, and combined hardware/software configurations (e.g., in an ECU such as the PCC ECU 120 depicted in FIGS. 1 and 2). Although illustrative details are provided in this section, it should be understood that alternative control logic and associated methods can be implemented and used in accordance with the present disclosure.

Figure 28:
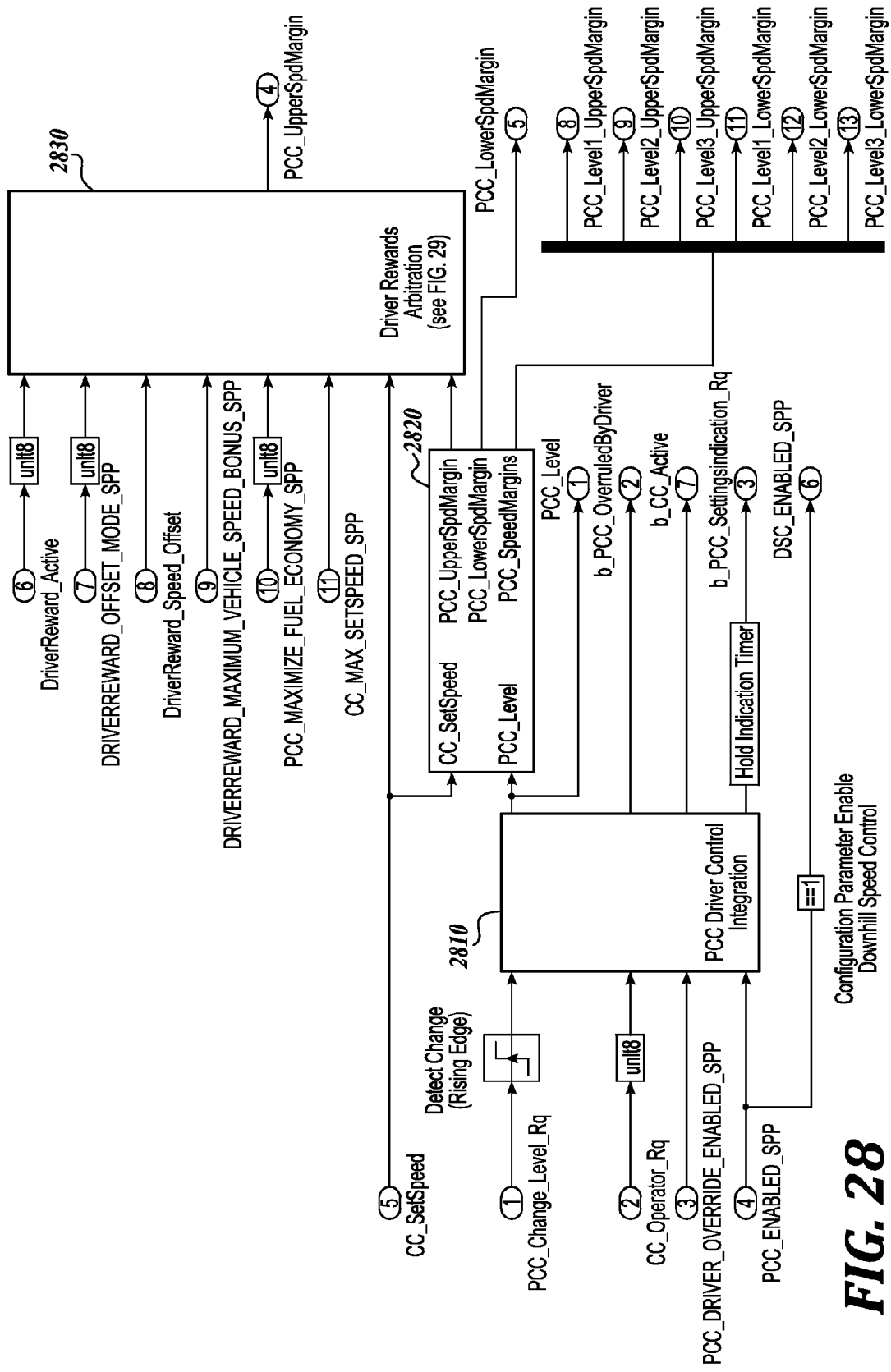
FIGS. 28-30 are diagrams of illustrative control logic for a PCC system with advanced operator control and feedback cabilities.

In the example shown in FIG. 28, a PCC driver control integration module 2810 receives the operator input signals PCC_Change_Level_Rq (to indicate a request for a change in the PCC level) and CC_Operator_Rq (to indicate a request for a change in the cruise control status (CC_State)). The PCC driver control integration module 2810 also receives the system parameters PCC_ENABLED_SPP (to indicate whether the PCC system is enabled) and PCC_DRIVER_OVERRIDE_ENABLED_SPP (to indicate whether the operator can override the function of an enabled PCC system). The module 2810 calculates a PCC level (PCC_Level) based on these signals. The module 2810 also outputs signals (b_PCC_Overruled_ByDriver, b_CC_Active, b_PCC_Settingsindication_Rq) to indicate possible updates in the PCC system that may result from the processing of the operator input and the PCC system parameters in the module 2810. In addition, in this example, DSC is enabled (as indicated by DSC_ENABLED_SPP) whenever the PCC system is enabled (as indicated by PCC_ENABLED_SPP).

In the example shown in FIG. 28, the PCC_Level signal is provided along with the cruise control set speed signal (CC_SetSpeed) to a speed margin module 2820. In this example, for PCC levels of 1, 2, or 3, the speed margin module 2820 calculates and outputs speed margin signals (e.g., PCC_UpperSpdMargin, PCC_LowerSpdMargin, and PCC_SpeedMargins), and different upper and lower speed margins may be calculated for each PCC level (e.g., PCC_Level1_UpperSpdMargin, etc.). These margins are calculated by multiplying CC_SetSpeed by a value associated with the margin for a particular PCC level, thereby allowing the margins to be proportional to the cruise control set speed. This can avoid potential drawbacks of static, narrow control bands that reduce the available fuel economy and drivability gains that may be available in wider control bands. Illustrative speed margin calculation values are shown in Table 1, below.

TABLE 1

| PCC Level | Speed Margin | Value | Offset from 60 mph Cruise Set Speed |
|---|---|---|---|
| 0 | Upper | 0 | 0 mph |
|   | Lower | 0 | 0 mph |
| 1 | Upper | 0 | 0 mph |
|   | Lower | −0.05 | −3.0 mph |
| 2 | Upper | 0.04 | +2.4 mph |
|   | Lower | −0.07 | −4.2 mph |
| 3 | Upper | 0.08 | +4.8 mph |
|   | Lower | −0.12 | −7.2 mph |

Values for calculating upper and lower speed margins

The values shown in Table 1, above, are only examples and may be replaced with other values or applied to different cruise set speeds to achieve different offsets.

Figure 29:
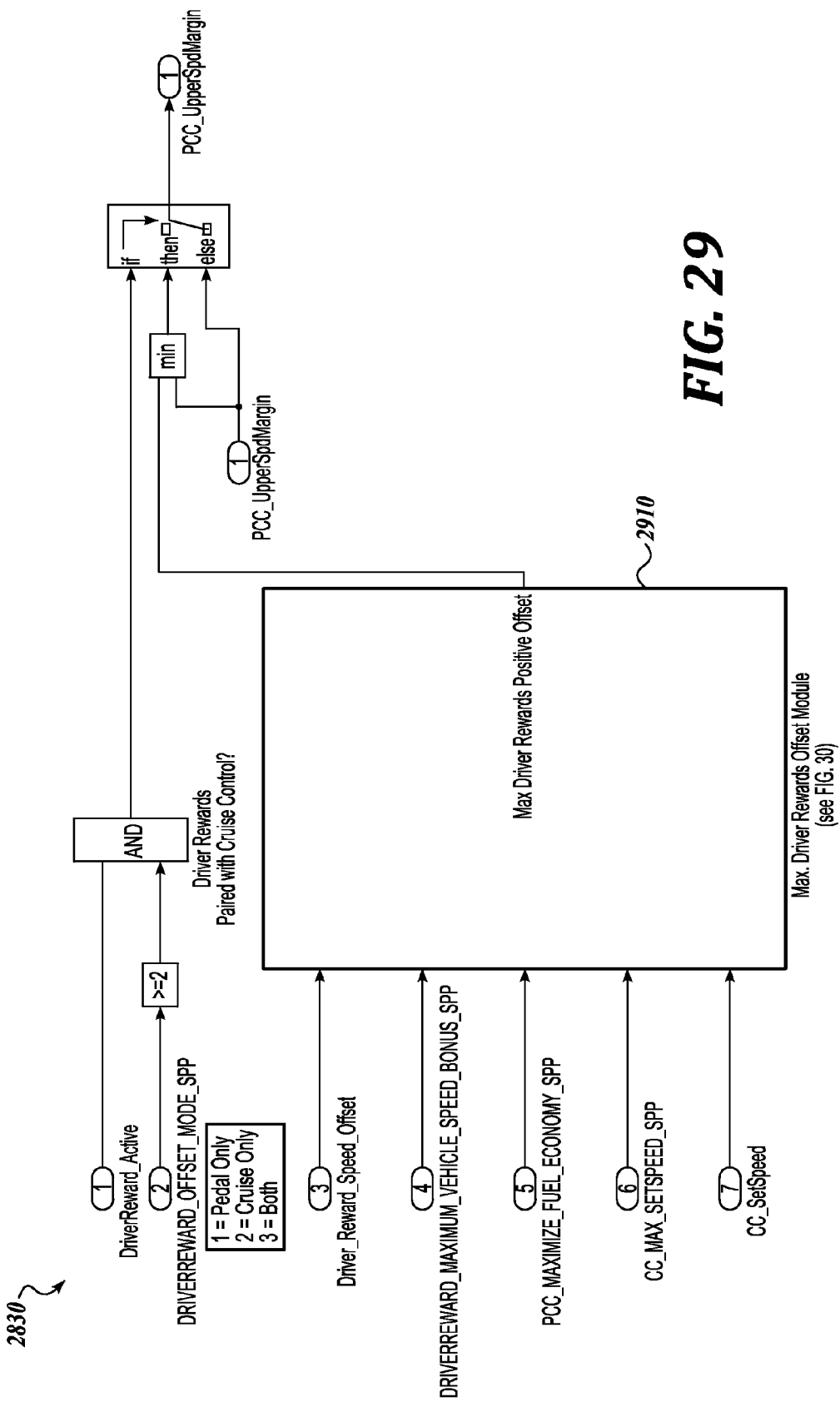

In the example shown in FIG. 28, the driver rewards arbitration module 2830 takes CC_SetSpeed and PCC_UpperSpdMargin as input and, when a change in CC_SetSpeed is detected, determines whether any changes should be made to PCC_UpperSpdMargin in view of driver rewards settings. In the illustrative driver rewards arbitration module 2830 shown in FIG. 29, if the driver reward system is active (DriverReward_Active=True) and the driver reward is applied to the cruise control speed limit (e.g., if DRIVERREWARD_OFFSET_MODE_SPP is greater than or equal to 2), then the output of the module 2830 is set to be the PCC_UpperSpeedMargin or a maximum driver rewards positive offset, whichever is less. The maximum driver rewards positive offset is calculated in the maximum driver rewards offset module 2910 based on the following input signals: Driver_Reward_Speed_Offset (the offset that is actually applied within the driver reward functionality; see Vehicle Speed Offset above), DRIVERREWARD_MAXIMUM_VEHICLE_SPEED_BONUS_SPP (the maximum vehicle speed offset within the driver reward functionality; see Vehicle Speed Bonus above), PCC_MAXIMIZE_FUEL_ECONOMY_SPP (indicating whether the PCC system is biased in favor of fuel economy), CC_MAX_SETSPEED_SPP (the maximum pedal speed plus any base cruise control offset speed; see $V_{MAX}$ and $V_{CC\ OFFSET}$, above), and CC_Set_Speed.

Figure 30:
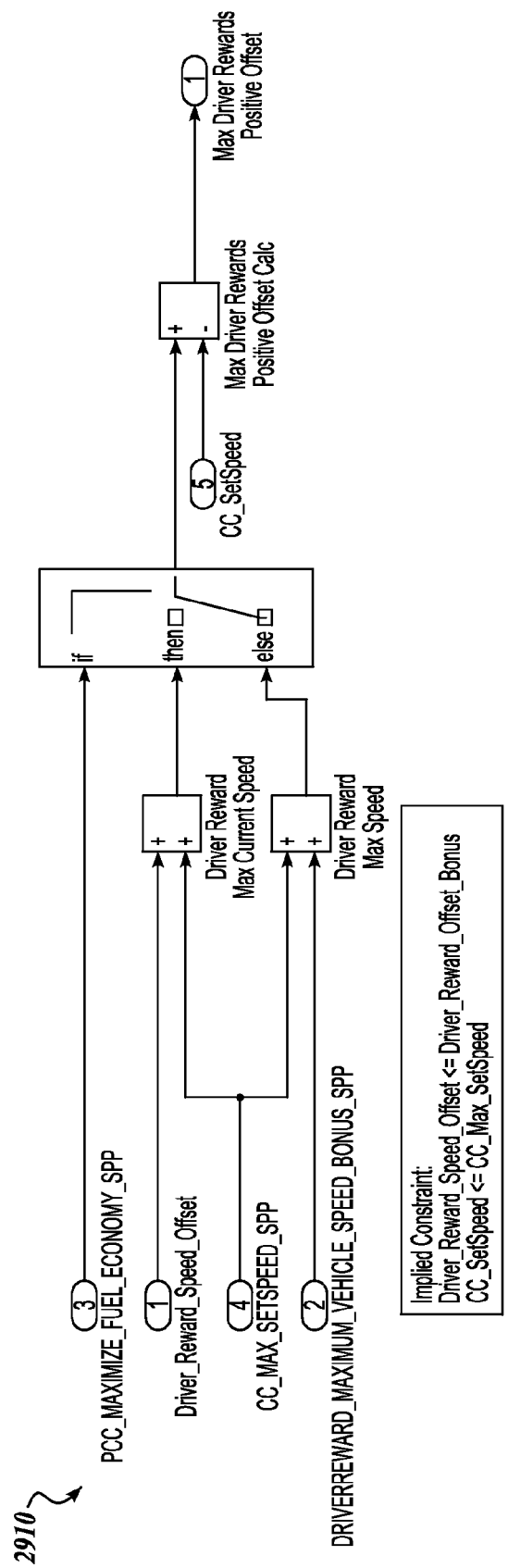

In the illustrative module 2910 shown in FIG. 30, if PCC_MAXIMIZE_FUEL_ECONOMY_SPP=True, then the Maximum Driver Rewards Positive Offset is Driver_Reward_Speed_Offset+CC_MAX_SETSPEED_SPP−CC_SetSpeed; otherwise, it is set to be CC_MAX_SETSPEED_SPP+DRIVERREWARD_MAXIMUM_VEHICLE_SPEED_BONUS_SPP−CC_SetSpeed.

For more information on illustrative driver rewards systems that may be used in combination with embodiments described herein, see co-pending U.S. patent application Ser. No. 14/020,638, entitled "Real-Time Driver Reward Display System and Method," filed on Sep. 6, 2013, which is incorporated herein by reference.

Example Methods

In this section, illustrative methods for a PCC system with advanced operator control and feedback cabilities are described. The methods described in this section can be performed by a variety of hardware, software, and combined hardware/software configurations (e.g., in an ECU such as the PCC ECU 120 depicted in FIGS. 1 and 2). Although illustrative details are provided in this section, it should be understood that alternative methods can be implemented and used in accordance with the present disclosure.

Figure 31:
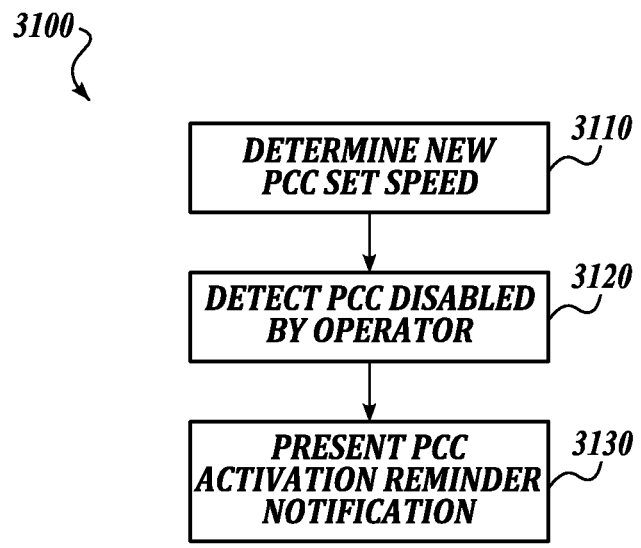
FIGS. 31-33 are flow charts of illustrative methods that may be implemented by a computing system such as the on-board vehicle computer system of FIG. 1.

FIG. 31 is a flow diagram of an illustrative method 3100 that may be performed by the on-board vehicle computer system 100 described above, or by some other system that includes a PCC system, in accordance with aspects of the present disclosure. At step 3110, the system determines a new PCC set speed for a vehicle. At step 3120, the system detects that the PCC system has been disabled (e.g., by an operator of the vehicle). At step 3130, the system presents a PCC activation reminder notification (e.g., to remind the vehicle operator to activate the disabled PCC system).

Figure 32:
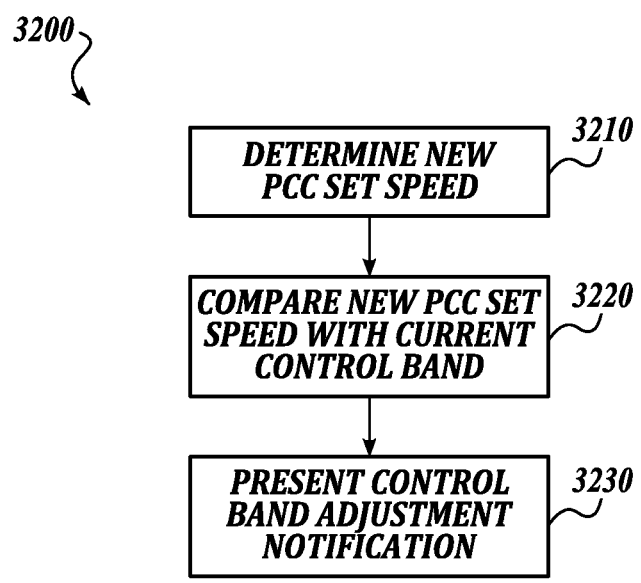

FIG. 32 is a flow diagram of another illustrative method 3200 that may be performed by the on-board vehicle computer system 100 described above, or by some other system that includes a PCC system, in accordance with aspects of the present disclosure. At step 3210, the system determines a new PCC set speed for a vehicle. At step 3220, the system compares the new PCC set speed with a current control band. At step 3230, the system presents a control band adjustment notification (e.g., to remind the vehicle operator to select a wider control band).

Figure 33:
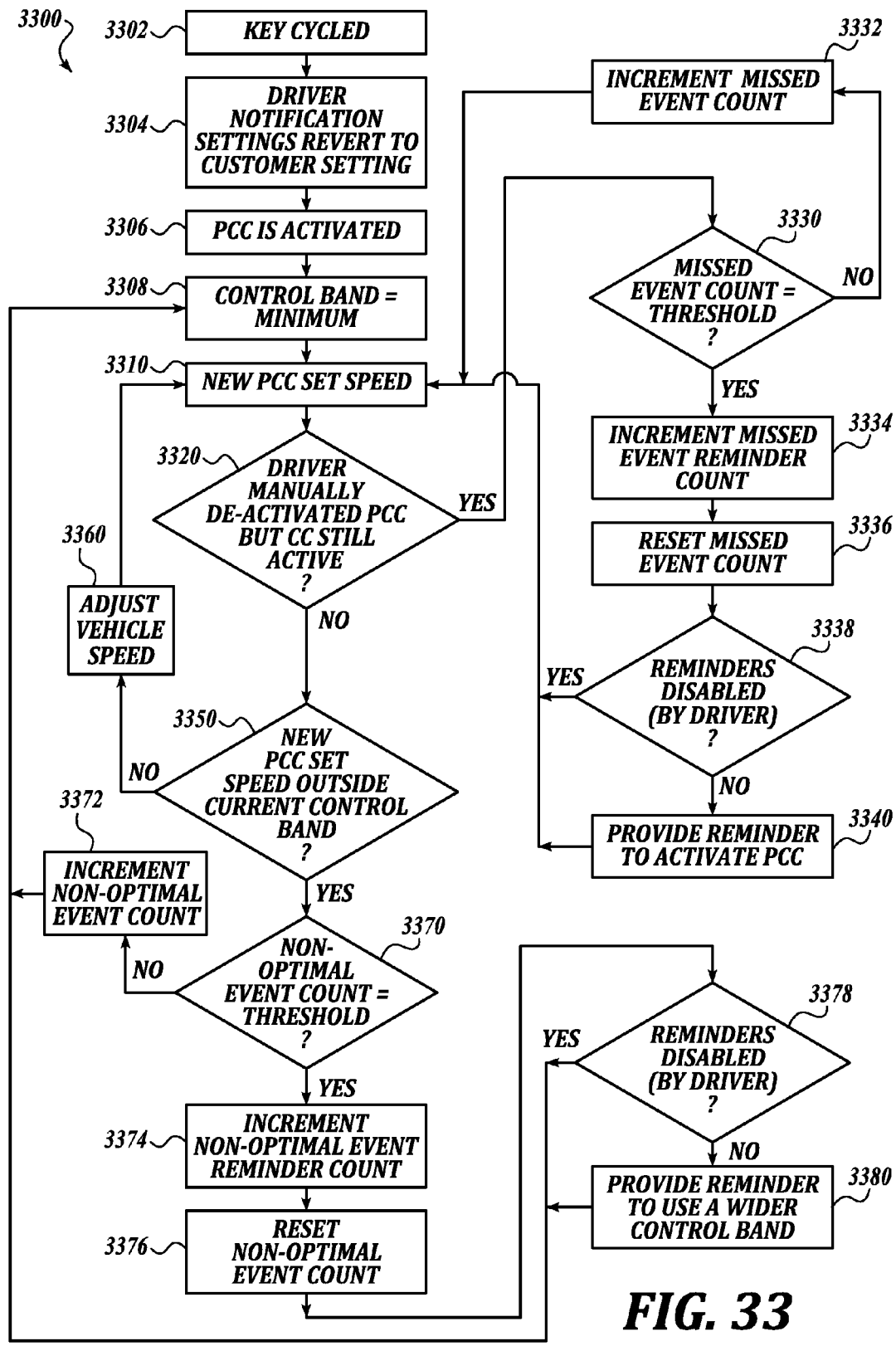

FIG. 33 is a flow diagram of a detailed method 3300 that combines aspects of the methods 3100 and 3200 described above, along with additional aspects. The method may be performed by the on-board vehicle computer system 100 described above, or by some other system that includes a PCC system, in accordance with aspects of the present disclosure. At steps 3302, 3304, 3306, and 3308, the PCC system is initiated as the key is cycled (step 3302), driver notification settings revert to customer settings (step 3304), the PCC system is activated (step 3306), and the control band is set to a minimum active level (e.g., PCC Level 0, with a zero positive offset). At step 3310, a new PCC set speed is calculated. If the PCC system has been deactivated by the driver but the cruise control system is still active (step 3320), a missed event count is compared with a threshold (step 3330). At step 3332, the missed event count is incremented if the threshold has not been reached. Otherwise, a missed event reminder count is incremented at step 3334. At step 3336, the missed event count is reset, and if reminders have not been disabled (step 3338), a reminder to activate the PCC system is provided at step 3340.

If the PCC system has not been deactivated, a determination is made at step 3350 as to whether the new PCC set speed is outside the current control band. If it is not, the vehicle speed is adjusted to the new PCC set speed at step 3360. If it is, a non-optimal event count is compared with a threshold (step 3370). At step 3372, the non-optimal event count is incremented if the threshold has not been reached. Otherwise, a non-optimal event reminder count is incremented at step 3374. At step 3376, the non-optimal event count is reset, and if reminders have not been disabled (step 3378), a reminder to use a wider control band is provided at step 3380.

The reminder counts can be used, for example, to ensure that a driver does not receive too many reminders to reactivate the PCC system or to use a wider control band.

Extensions and Alternatives

The particular signals, variables, and parameters described herein, as well as their respective possible ranges and states and the particular logic for processing them, are not required. Depending on implementation, more or fewer or different signals, variables, and parameters may be used to achieve similar results. In any of the examples described herein, the specific signals, variables, and parameters that are described can be separated into additional signals, variables, or parameters, or combined into fewer signals, variables, or parameters.

Many alternatives to the described methods are possible. Processing stages in the various methods can be separated into additional stages or combined into fewer stages. Processing stages in the various methods also can be omitted or supplemented with other methods or processing stages. Furthermore, processing stages that are described as occurring in a particular order can instead occur in a different order and/or in a parallel fashion, with multiple components or software processes concurrently handling one or more of the illustrated processing stages. As another example, processing stages that are indicated as being performed by a particular device or module may instead be performed by one or more other devices or modules.

Many alternatives to the set of operator notifications described herein are possible. For example, notifications described herein can be omitted, supplemented with additional notifications, or replaced with different notifications or effects. As another example, visual elements described herein can be omitted, supplemented with additional elements, or replaced with different elements to provide, for example, different granularity of reminders (e.g., by making reminders more abrupt or more gradual, as may be desired in different situations).

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The invention claimed is:

1. A computer-implemented method comprising:

by an on-board vehicle computing system of a vehicle, determining a new predictive cruise control set speed for the vehicle in a predictive cruise control system;

by the on-board vehicle computing system, comparing the new predictive cruise control set speed with a current speed control band that is adjustable by an operator of the vehicle; and based on the comparing, presenting a speed control band adjustment notification via an operator interface of the vehicle, wherein the speed control band adjustment notification includes a reminder to select a wider speed control band.

2. The computer-implemented method of claim 1, wherein presenting the speed control band adjustment notification is based at least in part on a feedback setting.

3. The computer-implemented method of claim 2, wherein the feedback setting is adjustable by the operator of the vehicle.

4. The computer-implemented method of claim 1, wherein presenting the speed control band adjustment notification is based at least in part on a count of speed change events in which predictive cruise control set speeds are outside a currently active speed control band.

5. The computer-implemented method of claim 1, wherein the operator interface comprises a touchscreen display.

6. An on-board vehicle computer system for a vehicle, the on-board vehicle computer system comprising:

at least one processing unit; and a memory having stored therein computer-executable instructions configured to cause the on-board vehicle computer system to:

determine a new predictive cruise control set speed for the vehicle in a predictive cruise control system;

compare the new predictive cruise control set speed with a current speed control band that is adjustable by an operator of the vehicle; and present a speed control band adjustment notification via an operator interface of the vehicle, wherein the speed control band adjustment notification includes a reminder to select a wider speed control band.

7. The on-board vehicle computer system of claim 6, wherein the speed control band adjustment notification is based at least in part on a feedback setting.

8. The on-board vehicle computer system of claim 7, wherein the feedback setting is adjustable by the operator of the vehicle.

9. The on-board vehicle computer system of claim 6, wherein the speed control band adjustment notification is based at least in part on a count of speed change events in which predictive cruise control set speeds are outside a currently active speed control band.

10. The on-board vehicle computer system of claim 6, wherein the operator interface comprises a touchscreen display.

11. One or more non-transitory computer-readable storage media having stored thereon program instructions configured to, when executed, cause a vehicle computer system to:

determine a new predictive cruise control set speed for a vehicle;

compare the new predictive cruise control set speed with a current speed control band that is adjustable by an operator of the vehicle; and based on the comparison, present a speed control band adjustment notification via an operator interface of the vehicle, wherein the speed control band adjustment notification includes a reminder to select a wider speed control band.

12. The computer-readable storage media of claim 11, wherein presentation of the speed control band adjustment notification is based at least in part on a feedback setting.

13. The computer-readable storage media of claim 12, wherein the feedback setting is adjustable by the operator of the vehicle.

14. The computer-readable storage media of claim 11, wherein presentation of the speed control band adjustment notification is based at least in part on a count of speed change events in which predictive cruise control set speeds are outside a currently active speed control band.

15. The computer-readable storage media of claim 11, wherein the operator interface comprises a touchscreen display.

* * * * *